United States Patent
Sole Rojals et al.

(10) Patent No.: US 9,363,510 B2
(45) Date of Patent: Jun. 7, 2016

(54) SCAN-BASED SLIDING WINDOW IN CONTEXT DERIVATION FOR TRANSFORM COEFFICIENT CODING

(71) Applicant: QUALCOMM Incorporated, San Diego, CA (US)

(72) Inventors: Joel Sole Rojals, La Jolla, CA (US); Rajan Laxman Joshi, San Diego, CA (US); Wei-Jung Chien, San Diego, CA (US); Vadim Seregin, San Diego, CA (US); Jianle Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 586 days.

(21) Appl. No.: 13/780,846

(22) Filed: Feb. 28, 2013

(65) Prior Publication Data

US 2013/0230097 A1   Sep. 5, 2013

Related U.S. Application Data

(60) Provisional application No. 61/606,356, filed on Mar. 2, 2012.

(51) Int. Cl.
| | |
|---|---|
| *H04B 1/66* | (2006.01) |
| *H04N 19/129* | (2014.01) |
| *H04N 19/13* | (2014.01) |
| *H04N 19/18* | (2014.01) |

(Continued)

(52) U.S. Cl.
CPC ....... *H04N 19/00109* (2013.01); *H04N 19/129* (2014.11); *H04N 19/13* (2014.11); *H04N 19/134* (2014.11); *H04N 19/18* (2014.11); *H04N 19/436* (2014.11)

(58) Field of Classification Search
CPC ............ H04N 19/00109; H04N 19/13; H04N 19/129; H04N 19/18; H04N 19/436; H04N 19/134
See application file for complete search history.

(56) References Cited

U.S. PATENT DOCUMENTS

| | | | |
|---|---|---|---|
| 8,130,828 B2 | 3/2012 | Hsu et al. | |
| 8,634,669 B2 * | 1/2014 | Auyeung | H04N 19/13 375/240.12 |

(Continued)

FOREIGN PATENT DOCUMENTS

| | | |
|---|---|---|
| WO | 2011068428 A1 | 6/2011 |
| WO | 2013070707 A1 | 5/2013 |

OTHER PUBLICATIONS

Belyaev, "Binary Arithmetic Coding System with Adaptive Probability Estimation by "Virtual Sliding Window"," 2006 IEEE Tenth International Symposium on Consumer Electronics, 2006, 5 pp.

(Continued)

*Primary Examiner* — Tat Chio
(74) *Attorney, Agent, or Firm* — Shumaker & Sieffert, P.A.

(57) ABSTRACT

A video coding process that includes defining a context derivation neighborhood for one of a plurality of transform coefficients based on a transform coefficient scan order. The process also includes determining a context for the one of the plurality of transform coefficients based on the context derivation neighborhood. The process also includes coding the one of the plurality of transform coefficients based on the determined context.

42 Claims, 12 Drawing Sheets

(51) Int. Cl.
*H04N 19/134* (2014.01)
*H04N 19/436* (2014.01)

(56) References Cited

U.S. PATENT DOCUMENTS

| | | | |
|---|---|---|---|
| 2005/0123207 A1* | 6/2005 | Marpe | H04N 19/196 382/239 |
| 2007/0248163 A1 | 10/2007 | Zuo et al. | |
| 2011/0255595 A1 | 10/2011 | Zuo et al. | |
| 2012/0093235 A1 | 4/2012 | Suh et al. | |
| 2013/0051475 A1 | 2/2013 | Joshi et al. | |

OTHER PUBLICATIONS

Bross et al., "High efficiency video coding (HEVC) text specification draft 6," Joint Collaborative Team on Video Coding, JCTVC-H1003, Nov. 21-30, 2011, 259 pp.

Bross et al., "High efficiency video coding (HEVC) text specification draft 7," Joint Collaborative Team on Video Coding, JCTVC-I1003_D2, Apr. 27-May 7, 2012, 290 pp.

Bross et al., "High efficiency video coding (HEVC) text specification draft 8," Joint Collaborative Team on Video Coding, JCTVC-J1003_D7, Jul. 11-20, 2012, 261 pp.

Bross et al., "High efficiency video coding (HEVC) text specification draft 9," Joint Collaborative Team on Video Coding, JCTVC-K1003_v7, Oct. 10-19, 2012, 290 pp.

Bross et al., "WD4: Working Draft 4 of High-Efficiency Video Coding," Joint Collaborative Team on Video Coding, JCTVC-F803_d2, Jul. 14-22, 2011, 226 pp.

Bross et al., "WD5: Working Draft 5 of High-Efficiency Video Coding," Joint Collaborative Team on Video Coding, JCTVC-G1103_d2, Nov. 21-30, 2011, 214 pp.

International Telecommunication Union, "Advanced video coding for generic audiovisual services," Standardization Sector of ITU, Jun. 2011, 674 pp.

Marpe et al., "Context-based adaptive binary arithmetic coding in the H.264/AVC video compression standard", IEEE Transactions on Circuits and Systems for Video Technology, Jul. 2003, vol. 13, No. 7, 17 pp.

U.S. Appl. No. 13/738,565, by Vadim Seregin, filed Jan. 10, 2013.

Wiegand et al., "WD2: Working Draft 2 of High-Efficiency Video Coding", Joint Collaborative Team on Video Coding, JCTVC-D503, Jan. 20-28, 2011, 153 pp.

Wiegand et al., "WD3: Working Draft 3 of High-Efficiency Video Coding," Joint Collaborative Team on Video Coding, JCTVC-E603, Mar. 16-23, 2011, 193 pp.

Wiegand et al., "WD1: Working Draft 1 of High-Efficiency Video Coding", Joint Collaborative Team on Video Coding, JCTVC-C403, Oct. 7-15, 2010, 137 pp.

Sole Rojals et al., "Transform Coefficient Coding in HEVC," IEEE Transactions on Circuits and Systems for Video Technology, vol. 22, No. 12, Dec. 2012, 13 pp.

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

International Search Report and Written Opinion—PCT/US2013/028588—ISA/EPO—Jun. 28, 2013, 13 pp.

Response to Written Opinion dated Jun. 28, 2013, from International Application No. PCT/US2013/028588, filed on Jan. 2, 2014, 32 pp.

Nguyen, et al., "Significant Coefficient Flag Context Models for Modular Processing", JCT-VC Meeting; MPEG Meeting; Jan. 2, 2012-Oct. 2, 2012; San Jose; (Joint Collaborative Team on Video Coding of ISO/IEC JTC1/SC29/WG11 and ITU-T SG. 16); URL: http://wftp3.1tu.int/av-arch/jctvc-site/, No. JCTVC-H0411, XP030111438, 7 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Second Written Opinion from International Application PCT/US2013/028588, dated Mar. 3, 2014, 7 pp.

Response to Second Written Opinion dated Mar. 3, 2014, from International Application No. PCT/US2013/028588, filed on May 2, 2014, 32 pp.

Third Written Opinion from International Application PCT/US2013/028588, dated Jun. 4, 2014, 8 pp.

Response to Third Written Opinion dated Jun. 4, 2014, from International Application No. PCT/US2013/028588, filed on Jun. 19, 2014, 32 pp.

International Preliminary Report on Patentability—PCT/US2013/028588, The International Bureau of WIPO—Geneva, Switzerland, Jul. 16, 2014, 8 pp.

* cited by examiner

SCAN-BASED SLIDING WINDOW IN CONTEXT DERIVATION FOR TRANSFORM COEFFICIENT CODING

This application claims priority to U.S. Provisional Application No. 61/606,356, filed 2 Mar. 2012, the entire content of which is incorporated by reference herein.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

The techniques of this disclosure generally relate to entropy coding video data. For example, during entropy coding, a video coder may convert information for transform coefficients into binarized form, thereby generating one or more bits, or "bins." The video coder may then code each bin of the transform coefficients using probability estimates for each bin, which may indicate a likelihood of a bin having a given binary value. The probability estimates may be included within a probability model, also referred to as a "context model." A video coder may select a context model by determining a context for the bin. Context for a bin of a syntax element may be determined based on values of related bins of previously coded syntax elements, such as syntax elements associated with other transform coefficients. The locations from which context is derived may be referred to as a context derivation neighborhood (also referred to as "context support neighborhood" or simply "support").

Aspects of this disclosure generally relate to a context derivation neighborhood that is based on a transform coefficient scan order. For example, aspects of this disclosure relate to determining a support based on the order in which transform coefficients are scanned to serialize a two-dimensional array of transform coefficients to a one-dimensional array of transform coefficients (at a video encoder) or inverse scanned to reconstruct a two-dimensional array of transform coefficients from a one-dimensional array of transform coefficients (at a video decoder).

In an example, aspects of this disclosure relate to a method of coding transform coefficients associated with residual video data in a video coding process that includes defining a context derivation neighborhood for one of a plurality of transform coefficients based on a transform coefficient scan order, determining a context for the one of the plurality of transform coefficients based on the context derivation neighborhood, and coding the one of the plurality of transform coefficients based on the determined context.

In another example, aspects of this disclosure relate to an apparatus for coding transform coefficients associated with residual video data in a video coding process that includes one or more processors configured to define a context derivation neighborhood for one of a plurality of transform coefficients based on a transform coefficient scan order, determine a context for the one of the plurality of transform coefficients based on the context derivation neighborhood, and code the one of the plurality of transform coefficients based on the determined context.

In another example, aspects of this disclosure relate to an apparatus for coding transform coefficients associated with residual video data in a video coding process that includes means for defining a context derivation neighborhood for one of a plurality of transform coefficients based on a transform coefficient scan order, means for determining a context for the one of the plurality of transform coefficients based on the context derivation neighborhood, and means for coding the one of the plurality of transform coefficients based on the determined context.

In another example, aspects of this disclosure relate to a non-transitory computer-readable medium comprising instructions that, when executed, cause one or more processors to define a context derivation neighborhood for one of a plurality of transform coefficients based on a transform coefficient scan order, determine a context for the one of the plurality of transform coefficients based on the context derivation neighborhood, and code the one of the plurality of transform coefficients based on the determined context.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
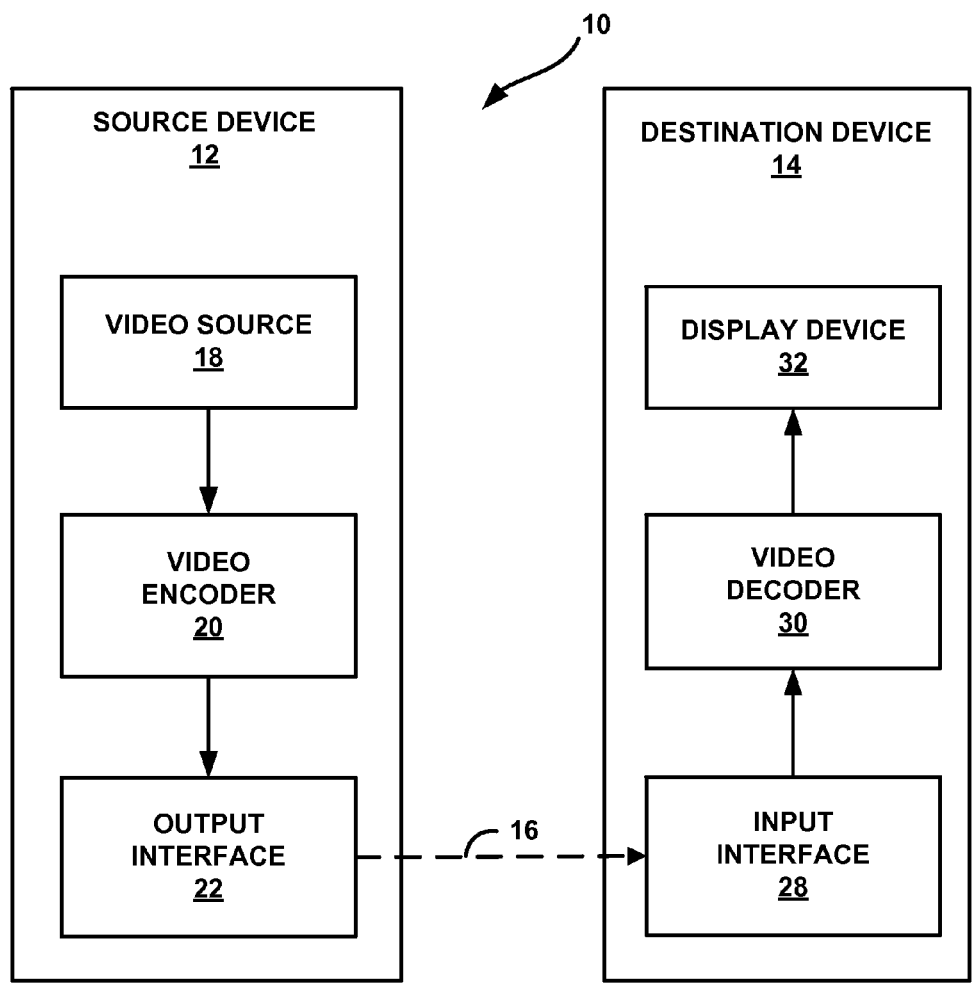
FIG. 1 is a block diagram illustrating an example video encoding and decoding system 10 that may utilize the techniques of this disclosure for deriving context.

A video coding device may attempt to compress video data by taking advantage of spatial and temporal redundancy. For example, a video encoder may take advantage of spatial redundancy by coding a block relative to neighboring, previously coded blocks. Likewise, a video encoder may take advantage of temporal redundancy by coding a block relative to data of previously coded frames. In particular, the video encoder may predict a current block from data of a spatial neighbor or from data of a previously coded frame. The video encoder may then calculate a residual for the block as a difference between the actual pixel values for the block and the predicted pixel values for the block. Accordingly, the residual for a block may include pixel-by-pixel difference values in the pixel (or spatial) domain.

The video encoder may then apply a transform to the values of the residual to compress energy of the pixel values into a relatively small number of transform coefficients in the frequency domain. The video encoder may also quantize the transform coefficients. In general, the term "transform coefficient" refers to a coefficient in the transform domain for a residual block, which may or may not have been quantized.

The video encoder may scan the quantized transform coefficients to convert a two-dimensional matrix of quantized transform coefficients into a one-dimensional vector including the quantized transform coefficients. The process of scanning the coefficients is sometimes referred to as serializing the coefficients.

The video encoder may then apply an entropy coding process to entropy encode the scanned transform coefficients, as well as other syntax elements associated with the encoded video data for use by a video decoder in decoding the video data. Example entropy coding processes may include, for example, context-adaptive variable length coding (CAVLC), context-adaptive binary arithmetic coding (CABAC), syntax-based context-adaptive binary arithmetic coding (SBAC), probability interval partitioning entropy (PIPE) coding or other entropy encoding methodologies. As described in greater detail below, references to entropy coding "transform coefficients" may refer to both entropy coding unquantized transform coefficients as well as entropy coding quantized transform coefficients.

In general, context-adaptive coding is performed on binarized values. Accordingly, a video encoder may convert an absolute value of each value being coded (e.g., transform coefficient levels, symbols, syntax elements, and the like) into binarized form. In this way, each non-zero value being coded may be binarized, e.g., using a unary coding table or other coding scheme that converts a value to a codeword having one or more bits, or "bins."

The video encoder may then select a probability model or "context model" that operates to code symbols associated with a block of video data. The probability model indicates a likelihood of a bin having a given binary value (e.g., "0" or "1"). Accordingly, at the encoder, a target symbol may be coded by using the probability model. At the decoder, a target symbol may be parsed by using the probability model. In any case, a video coder may select a probability model by determining a context for the bin.

Context for a bin of a syntax element may include values of related bins of previously coded neighboring syntax elements. As one example, a context for coding a bin of a current syntax element may include values of related bins of previously coded neighboring syntax elements, e.g., on the top and to the left of the current syntax element. The locations from which context is derived may be referred to as a context derivation neighborhood (also referred to as "context support neighborhood" or simply "support"). For example, a position-based context derivation neighborhood may include predetermined transform coefficient locations relative to a transform coefficient currently being coded.

In an example for purposes of illustration, a five point position-based support may be used to define a context model for coding the bins of a significance map (e.g., indicating the locations of non-zero transform coefficients in a block of video data). The five point support may include five transform coefficient positions that neighbor the significance flag currently being coded. In this example, a probability model is identified by Ctx, and Ctx may be defined as a sum of the significant flags in every point of the support, where a significance flag is set to "1" if a corresponding transform coefficient is nonzero or "0" if a corresponding transform coefficient is zero, as shown in Equation (1) below, where S and p correspond to significance flags in the support:

$$Ctx = \sum_{p \in S}(coef_p != 0), Ctx = (Ctx + 1) >> 1 \quad (1)$$

In other examples, a context model may based on values associated with previously coded sub-blocks (e.g., a number of significance flags in a previously coded sub-block). In any case, in some examples, Ctx may be an index or offset that is applied to select one of a plurality of different contexts, each of which may correspond to a particular probability model. Hence, in any case, a different probability model is typically defined for each context. After coding the bin, the probability model is further updated based on a value of the bin to reflect the most current probability estimates for the bin. For example, a probability model may be maintained as a state in a finite state machine. Each particular state may correspond to a specific probability value. The next state, which corresponds to an update of the probability model, may depend on the value of the current bin (e.g., the bin currently being coded). Accordingly, the selection of a probability model may be influenced by the values of the previously coded bins, because the values indicate, at least in part, the probability of the bin having a given value.

According to some examples, the positions of the significant coefficients (i.e., nonzero transform coefficients) in a video block may be coded prior to the values of the transform coefficients, which may be referred to as the "levels" of the transform coefficients. The process of coding the locations of the significant coefficients may be referred to as significance map coding. A significance map (SM) includes a two-dimensional array of binary values that indicate locations of significant coefficients.

For example, an SM for a block of video data may include a two-dimensional array of ones and zeros, in which the ones indicate positions of significant transform coefficients within the block and the zeros indicate positions of non-significant (zero-valued) transform coefficients within the block. The ones and zeros are referred to as "significant coefficient flags." Additionally, in some examples, the SM may include another 2-D array of ones and zeros, in which a one indicates a position of a last significant coefficient within the block according to a scan order associated with the block, and the zeros indicate positions of all other coefficients within the block. In this case, the one is referred to as the "last significant coefficient flag." In other examples, a last significant coefficient flag may not be used. Rather, the last significant coefficient in a block may be coded first, prior to coding the rest of the SM.

The remaining bins of the binarized transform coefficients (as well as any other syntax elements being context coded) may then be coded in one or more additional coding passes. For example, during a first pass, a video coder may entropy code the SM. During a second pass, the video coder may entropy code a first bin of the transform coefficient levels. In some examples, the first bin may indicate whether the coefficient level is greater than one, and a second bin may indicate whether the coefficient level is greater than two. A third bin may be used to indicate a reminder value for the level of any coefficients that are greater than two, e.g., coding a value of Level-3. Another bin may indicate, in some examples, a sign of a coefficient level.

The video coder may continue to perform coding passes until all of the information associated with the transform coefficients of a block is coded. In some examples, the video coder may code the bins of a block of video data using a combination of context adaptive and non-context adaptive coding. For example, for one or more passes, the video coder may use a bypass mode to bypass, or omit, the regular context-adaptive arithmetic coding process. In such instances, a fixed equal probability model may be used to code a bypass coded bin.

In some examples, to improve efficiency and/or simplify implementation, a block of transform coefficients may be divided into sub-sets (which may take the form of a plurality of sub-blocks) for purposes of coding. For example, it may be computationally inefficient for a software or hardware video coder to implement a particular scan (e.g., zigzag, diagonal, horizontal, vertical, or the like) when coding relatively large blocks such as a 32×32 or 64×64 block. In such an example, a video coder may divide a block into a plurality of smaller sub-blocks of a predetermined size (e.g., 8×8 sub-blocks). The video coder may then scan and code each sub-block in sequence until the entire block has been coded.

In any case, using a position-based context support neighborhood to calculate context may be relatively computationally expensive. In example of the five point position-based support described above, a video coder must determine the significance of transform coefficients located at positions (x+1, y), (x, y+1), (x+1, y+1), (x+2, y) and (x, y+2) when coding each transform coefficient at position (x, y). Moreover, the video coder may also determine whether the positions of the transform coefficients in the support are located inside or outside of the block that includes the transform coefficient currently being coded.

A position-based support may also present complexity associated with data access. For example, in example of the five point position-based support described above, supports for calculating contexts for consecutive transform coefficients in scan order may exhibit little or no overlap from the first transform coefficient to the next transform coefficient. That is, two transform coefficients that are scanned and coded in succession may share few or no positions in their respective supports. Accordingly, the video coder may access up to five different transform coefficients for calculating each context (e.g., rather than sharing data for context calculation).

In an example for purposes of illustration, assume a block of transform coefficients is sub-divided into 4×4 sub-blocks. Assume further that the sub-blocks are each scanned using a diagonally oriented scanning pattern. In this example, a support for a final transform coefficient being scanned in one sub-block may not share any support positions with a first transform being scanned in the next sub-block. Accordingly, a video coder must retrieve a relatively large amount of data to calculate the contexts for these positions, which may slow the coding process.

Aspects of this disclosure generally relate to a context derivation neighborhood that is based on a transform coefficient scan order. For example, rather than using a position-based support to determine context, described above, aspects of this disclosure relate to using a support to determine context that is based on the order in which transform coefficients are scanned during coding. That is, according to aspects of this disclosure, a support is determined based on the order in which transform coefficients are scanned to serialize a two-dimensional array of transform coefficients to a one-dimensional array of transform coefficients (at a video encoder) or inverse scanned to reconstruct a two-dimensional array of transform coefficients from a one-dimensional array of transform coefficients (at a video decoder).

Hence, according to aspects of this disclosure, a video coder (e.g., a video encoder or video decoder) may determine a support for deriving context for context coding transform coefficients (e.g., significance, level, sign, or the like) based on a set of previous transform coefficients in scan order. In some examples, the set of previous transform coefficients in scan order may include a predetermined number of consecutive transform coefficients in scan order (e.g., three, four, five, or the like). The set of transform coefficients included in the support may be defined by a "sliding window," as described below.

In an example for purposes of illustration, a video decoder may determine context for decoding a first transform coefficient (n) based on a set of previous coefficients in scan order (e.g., n+i to n+j, where i is coded prior to j). For example, the video decoder may determine context for decoding a first transform coefficient (n) based on a set of five previous transform coefficients in scan order (n+1 to n+5). Next, the video decoder may determine context for decoding a second transform coefficient (n−1) by sliding a window that includes a predetermined number of transform coefficients one position in the scan order. That is, according to aspects of this disclosure, the sliding window identifies the transform coefficients that are used to determine context. The window "slides" or moves in the scan order as successive transform coefficients are coded.

Accordingly, the video decoder may determine context for decoding the second transform coefficient (n−1) based on a new set of five previous transform coefficients in scan order (n to n+4). The new set of five previous transform coefficients includes the first transform coefficient (n) and removes the last transform coefficient (n+5) of the first set. In this way, the window of transform coefficients for determining context continues to slide in the scan order with the transform coefficients being scanned. While the example above is described with respect to a video decoder, the same technique may be applied by a video encoder. In addition, more or fewer that five transform coefficients may be defined by the window.

In some examples, a video coder may reset the support at the beginning of each block or sub-block. For example, the video coder may begin with a new set of support when calculating context for coding the first transform coefficient in a block or sub-block. In this example, the video coder may not determine the initial support based on the scan order. Rather, in some examples, the video coder may implement a position-based support, as described above, for calculating context for coding the first transform coefficient in a block or sub-block. Then, as the video coder continues to code transform coefficients in the block or sub-block, the video coder may populate a sliding window of support with transform coefficients in scan order to calculate context.

For example, the video coder may populate the sliding window of support one transform coefficient at a time while coding the transform coefficients. Thus, the video coder may use a mix of transform coefficients of the initial support and transform coefficients based on the scan order for determining support for one or more transform coefficients of a block or sub-block. For example, the video coder may use an initial, five point support for determining context for a first transform coefficient of a block or sub-block. In this example, the video coder may determine context for a second transform coefficient of the block or sub-block in scan order using four transform coefficients from the initial support and one transform coefficient based on the scan order. Likewise, the video coder may determine context for a third transform coefficient of the block or sub-block in scan order using three transform coefficients from the initial support and two transform coefficients based on the scan order, and so on until the sliding window of support is fully populated with transform coefficients based on the scan order.

In this way, the techniques of this disclosure may simplify context computations. For example, when implementing the techniques of this disclosure, a video coder does not need to determine the relative location of a transform coefficient (in a block or sub-block of transform coefficients) in order to determine the context for the transform coefficient. In addition, the techniques of this disclosure may reduce the amount of data that is accessed from memory when determining context. For example, a video coder may reuse much of the data when determining contexts for consecutive coefficients. That is, the video coder only retrieves data associated with one new transform coefficient as the context calculation window descried slides from one transform coefficient to the next. Moreover, a video coder may apply the same techniques to determine context, regardless of the orientation of the scan that is being used to scan the transform coefficients (e.g., zig-zag, diagonal, horizontal, vertical, and the like).

In some instances, parallel processing may be used to increase coding efficiency. In general, parallel processing generally refers performing more than one calculation concurrently. However, in some examples, parallel processing may not include exact temporal coincidence for two processes. Rather, parallel processing may include an overlap or temporal progression such processes are not performed at the same time. Parallel processing may be performed by parallel hardware processing cores or with parallel software threads operating on the same or different processing cores.

In any case, with respect to transform coefficient coding, parallel processing may be used to calculate context for more than one transform coefficient in parallel. However, in order to calculate more than one transform coefficient in parallel, all of the positions in the support must be available for coding. For example, as noted above, a context model for coding a significance flag may be determined by summing all of the significance flags in the support. When determining a context model for coding a significance flag, all of the significance flags in the support must be previously coded (determined) in order for such flags to be available for the summation.

In some instances, one or more significance flags in a particular support may be dependent on other significance flags in the support for determining context. For example, assume a first significance flag A includes in its support a neighboring significance flag B. Accordingly, in order to determine a context model for significance flag A, the significance flag B must be available (coded). Hence, in this example, contexts for significance flags A and B may not be coded in parallel, because the context for significance flag A depends on the significance flag B (e.g., the significance contexts are dependent within the support). A video coder must wait to calculate the context for significance flag A until the significance flag B has been coded, thereby preventing parallel context calculation and reducing or eliminating the efficiency gains associated with parallel processing of contexts.

The parallel context calculation process described above may introduce additional complexity to the context determination process. For example, in some instances, a video coder may calculate more than one context for coding more than one transform coefficient in parallel (e.g., 2 bin parallelization, 3 bin parallelization, or the like). In such instances, when using a position-based support to calculate context, the video coder may modify the support to remove context dependencies noted above. Such position-based support modifications may add complexity and may slow the context calculation process.

According to aspects of this disclosure, the sliding window approach described above may simplify parallel context calculations. For example, in some instances, a gap may be introduced between the transform coefficient being coded and the set of transform coefficients of the support in scan order. That is, a video coder may skip one or more transform coefficients between the transform coefficient being coded and the transform coefficients in the sliding window that defines the support. The gap between the transform coefficient being coded and the transform coefficients of the support may remove the context dependencies described above.

In an example for purposes of illustration, a video decoder may determine context for decoding a first transform coefficient (n) based on a set of five previous transform coefficients in scan order (n+2 to n+6). The video decoder may also determine context for decoding a second transform coefficient (n−1) based on a set of five previous transform coefficients in scan order (n+3 to n+7). Introducing a gap between the first transform coefficient (n) and the support (n+2 to n+6) (e.g., skipping n+1) removes a context dependency and such that the video decoder may calculate the context for the first transform coefficient (n) and the second transform coefficient (n+1) in parallel. The window defining the support may slide in the scan order as additional transform coefficients are coded, as described above. While the example above is described with respect to a video decoder, the same technique may be applied by a video encoder. In addition, more or fewer that five transform coefficients may be defined by the window.

According to aspects of this disclosure, the number of transform coefficients in the gap between the transform coefficient being coded and the associated support may be increased to accommodate additional parallel context calculations. For example, a gap of two transform coefficients may allow three contexts to be calculated in parallel, and so on. Accordingly, a video coder does not need to determine special position-based supports according to the number of contexts being calculated in parallel.

While aspects of this disclosure may generally refer to determining context for a transform coefficient, it should be understood that transform coefficients may include associated significance, level, sign, and the like. Accordingly, certain aspects of this disclosure may be particularly relevant to determining context for coding a significance map that includes significance information associated with the transform coefficients.

FIG. 1 is a block diagram illustrating an example video encoding and decoding system 10 that may utilize the techniques of this disclosure for deriving context. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for performing simplified deblocking decisions. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for deriving context in accordance with this disclosure may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

This disclosure may generally refer to video encoder 20 "signaling" certain information to another device, such as video decoder 30. It should be understood, however, that video encoder 20 may signal information by associating certain syntax elements with various encoded portions of video data, thereby signaling information within a coded bitstream. That is, video encoder 20 may "signal" data by storing certain syntax elements to headers of various encoded portions of video data. In some cases, such syntax elements may be encoded and stored (e.g., stored to computer-readable medium 16) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 may operate according to a video compression standard, such as the ITU-T H.264 standard, alternatively referred to as MPEG-4, Part 10, Advanced Video Coding (AVC), or extensions of such standards. The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. Other examples of video compression standards include MPEG-2 and ITU-T H.263.

The JCT-VC is working on development of the HEVC standard. While the techniques of this disclosure are not limited to any particular coding standard, the techniques may be relevant to the HEVC standard. The latest Working Draft (WD) of HEVC, Bross, et al., "High Efficiency Video Coding (HEVC) text specification draft 9," and referred to as HEVC WD9 hereinafter, is available from http://phenix.int-evey.fr/jct/doc_end_user/documents/11_Shanghai/wg11/JCTVC-K1003-v13.zip, as of Feb. 21, 2013.

The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs.

Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

The HM supports prediction in various PU sizes, also referred to as partition modes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan.

After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may further send syntax data, such as block-based syntax data, frame-based syntax data, and group of pictures (GOP)-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video encoder 20 may perform context-based coding (e.g., CABAC) on binarized values (e.g., binarized transform coefficients, symbols, syntax elements, and the like). For example, for each bin, video encoder 20 may select a probability model or "context model" that operates on context to code symbols associated with a block of video data. The probability model indicates a likelihood of a bin having a given binary value (e.g., "0" or "1").

Video encoder 20 may select a probability model by determining a context for the bin. The positions from which context is derived may be referred to as a context derivation neighborhood (also referred to as "context support neighborhood" or simply "support").

In some examples, video encoder 20 may use a position-based five-point support neighborhood to define a context model, although other sized supports could be used with more or fewer support positions. The five point support may include five transform coefficient positions that spatially neighbor the significance flag currently being coded. Using the support, video encoder 20 may define a probability model as a sum of the significant flags in every point of the support.

However, using a position-based context support neighborhood to calculate context may be relatively computationally expensive. For example, to use the five point position-based support described above, video encoder 20 must determine the significance of transform coefficients at five different locations. Video encoder 20 may also determine whether the positions of the transform coefficients in the support are located inside or outside of the block that includes the transform coefficient currently being coded. In addition, video encoder 20 may not be able to reuse support data when calculating consecutive contexts. Rather, video encoder 20 may be required to access data associated with up to five transform coefficients for each context being calculated.

Aspects of this disclosure generally relate to a context derivation neighborhood that is based on a transform coefficient scan order. For example, rather than using a position-based support to determine context, according to aspects of this disclosure, video encoder 20 may encode transform coefficients associated with residual video data in a video coding process by defining a context derivation neighborhood for one of a plurality of transform coefficients based on a coefficient scan order. Video encoder 20 may also determine a context for the one of the plurality of transform coefficients based on the context derivation neighborhood. Video encoder 20 may then encode the one of the transform coefficients based on the determined context.

To define a context derivation neighborhood for one of a plurality of transform coefficients based on a coefficient scan order, video encoder 20 may identify a set of previous transform coefficients in scan order. In some examples, the set of previous transform coefficients in scan order may include a predetermined number of consecutive transform coefficients in scan order (e.g., three, four, five, or the like). As noted above, a sliding window may be used to define the support. For example, for each consecutive transform coefficient being coded, video encoder 20 may add a new transform coefficient in scan order to the window and remove a transform coefficient from the relative end of the previous support. In this way, the window of transform coefficients for determining context continues to slide in the scan order with the transform coefficients being scanned.

In some examples, video encoder 20 may reset the support at the beginning of each block or sub-block. For example, video encoder 20 may begin calculating context for the first transform coefficient for each block or sub-block with a new support. In some examples, video encoder 20 may use a support that is not based on the scan order to calculate the context for coding the first transform coefficient in a block or sub-block. Video encoder 20 may then switch to a support that is based on the scan order by populating a sliding window of support with transform coefficients in the scan order.

In this way, the techniques of this disclosure may simplify context computations. For example, video encoder 20 does not need to determine the relative location of a transform coefficient (in a block or sub-block of transform coefficients) in order to determine the context for the transform coefficient. In addition, video encoder 20 may reduce the amount of data that is accessed from memory when determining context. For example, video encoder 20 only retrieves data associated with one new transform coefficient as the context calculation window descried slides from one transform coefficient to the next. Moreover, video encoder 20 may apply the same techniques to determine context, regardless of the orientation of the scan that is being used to scan the transform coefficients (e.g., zig-zag, diagonal, horizontal, vertical, and the like).

In some instances, video encoder 20 may also implement the techniques of this disclosure to determine more than one context (for more than one transform coefficient) in parallel. For example, as noted above, in order to calculate more than one transform coefficient in parallel, all of the positions in the support must be available for coding. In some instances, however, one or more significance flags in a particular support may be dependent on other significance flags in the support for determining context.

According to aspects of this disclosure, video encoder 20 may implement the sliding window approach described above to perform parallel context calculations. For example, video encoder 20 may introduce a gap between the transform coefficient being coded and the set of transform coefficients included in the support. That is, video encoder 20 may skip one or more transform coefficients between the transform coefficient being coded and the transform coefficients in the sliding window that defines the support. Video encoder 20 may introduce the gap between the transform coefficients to remove the context dependencies described above.

According to aspects of this disclosure, the number of transform coefficients in the gap between the transform coefficient being coded and the associated support may be increased to accommodate additional parallel context calculations. For example, video encoder 20 may insert a gap of one transform coefficient between the transform coefficient being coded and the sliding window to support the calculation of two contexts in parallel (e.g., the context for the transform coefficient being coded and the next (skipped) transform coefficient in scan order). In another example, video encoder 20 may insert a gap of two transform coefficients between the transform coefficient being coded and the sliding window to support the calculation of three contexts in parallel (e.g., the context for the transform coefficient being coded and the next two (skipped) transform coefficients in scan order). Video encoder 20 may increase the gap in order to accommodate a greater degree of parallelism. In this way, video encoder 20 does not need to determine special position-based supports according to the number of contexts being calculated in parallel.

Video decoder 30, upon receiving the coded video data, may perform a decoding pass generally reciprocal to the encoding pass described with respect to video encoder 20. Although generally reciprocal, video decoder 30 may, in some instances, perform techniques similar to those performed by video encoder 20. Video decoder 30 may also rely on syntax elements or other data contained in a received bitstream that includes the data described with respect to video encoder 20.

According to aspects of this disclosure, for example, video decoder 30 may decode transform coefficients associated with residual video data in a video coding process by defining a context derivation neighborhood for one of a plurality of transform coefficients based on a coefficient scan order, as described above with respect to video encoder 20. Video decoder 30 may also determine a context for the one of the plurality of transform coefficients based on the context derivation neighborhood. Video decoder 30 may then decode the one of the transform coefficients based on the determined context.

While aspects of this disclosure may generally refer to determining context for a transform coefficient, it should be understood that transform coefficients may include associated significance, level, sign, and the like. Multiple scanning passes may be used to code significance and level, e.g., coding level greater than 0, level greater than 1, level greater than 2, and so forth. In one example, five different syntax elements may be used to code values of:

absolute value of level greater than 0,
absolute value of level greater than 1,
absolute value of level greater than 2,
absolute value of level minus 3, and
sign.

Accordingly, certain aspects of this disclosure may be particularly relevant to determining context for coding a significance map that includes significance information associated with the transform coefficients. Of course, other types of syntax elements and a different number of scanning passes could also be used.

Figure 2:
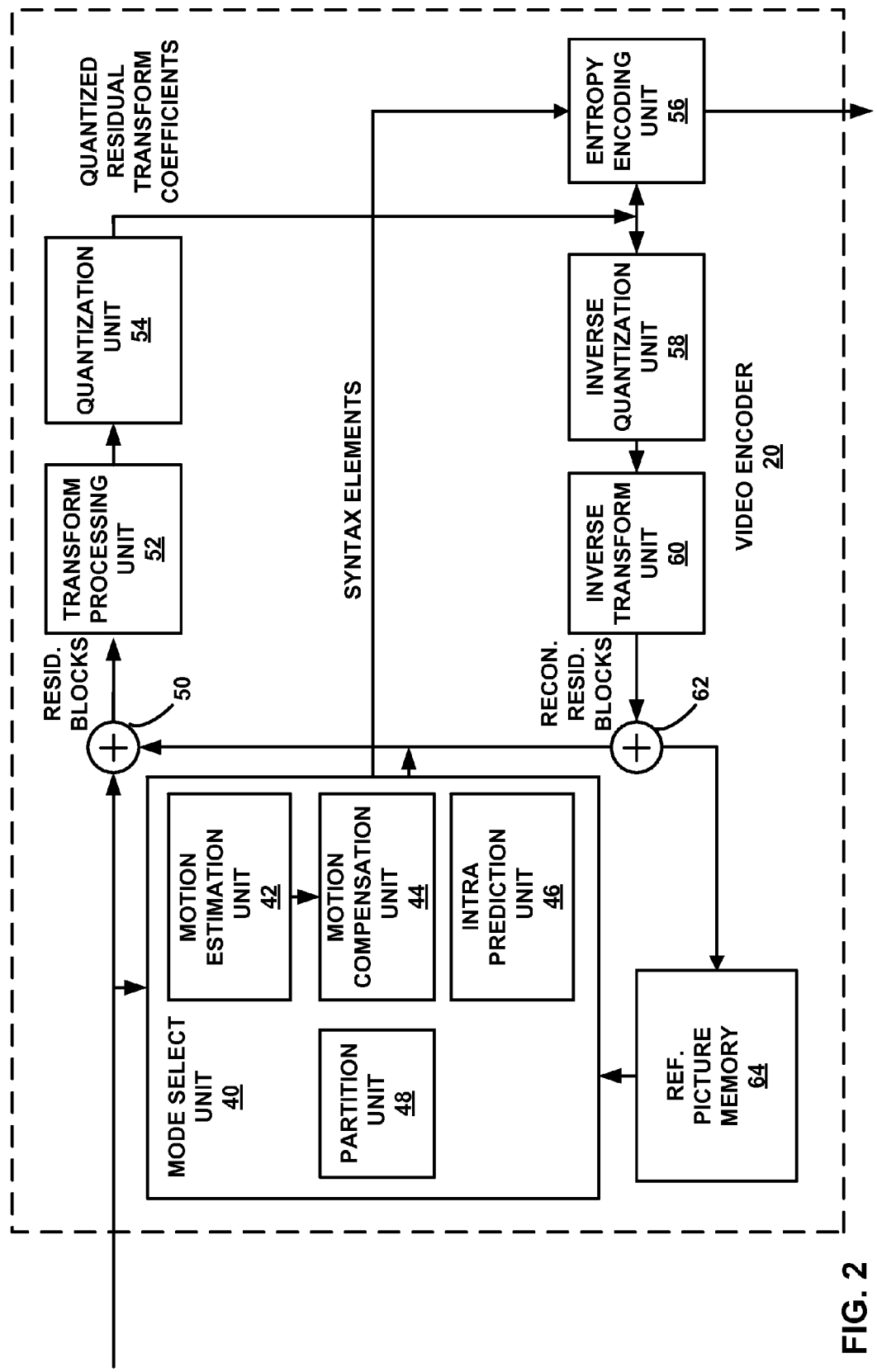
FIG. 2 is a block diagram illustrating an example of a video encoder 20 that may use the techniques of this disclosure for deriving context.

FIG. 2 is a block diagram illustrating an example of a video encoder 20 that may use the techniques of this disclosure for deriving context. The video encoder 20 will be described in the context of HEVC coding for purposes of illustration, but without limitation as to other coding standards or methods that may require context-adaptive coding of transform coefficients.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal compression. Intra-prediction unit 46 may alternatively perform intra-predictive coding of the received video block relative to one or more neighboring blocks in the same frame or slice as the block to be coded to provide spatial compression. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics.

In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below.

In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique.

Entropy encoding unit 56 may perform techniques of this disclosure to determine a context derivation neighborhood that is based on a transform coefficient scan order. For example, rather than using a position-based support to determine context for entropy encoding bins of binarized transform coefficients (e.g., significance, sign, level, and the like), entropy encoding unit 56 may use a support to determine context that is based on the order in which transform coefficients are scanned (e.g., by transform processing unit 52 or quantization unit 54 described above) during encoding.

In this way, entropy encoding unit 56 may use a sliding window of support to perform context calculation. For example, as entropy encoding unit 56 encodes successive transform coefficients in scan order, entropy encoding unit 56 slides the support used to determine context in the scan order. That is, for each successive transform coefficient being encoded, entropy encoding unit 56 adds a transform coefficient in the scan order to the support. In addition, entropy encoding unit 56 removes the last transform coefficient (relative to the scan order) from the support. Hence, the window defining the support slides along the scan order as the transform coefficients are scanned in the scan order.

Entropy encoding unit 56 may determine a support for calculating context that includes a predetermined number of transform coefficients in scan order (e.g., three, four, five, or the like). In some examples, entropy encoding unit 56 may determine a support having consecutive transform coefficients in scan order.

Entropy encoding unit 56 may reset the support at the beginning of each block or sub-block. For example, entropy encoding unit 56 may begin calculating context for one or more transform coefficients of a block or sub-block with a new support, which, in some examples, may not be based on the scan order. That is, in some examples, entropy encoding unit 56 may use a position-based support to calculate context for one or more transform coefficients in a block and may use a support based on the scan order to calculate context for one or more other transform coefficients in the block or sub-block. In such examples, entropy encoding unit 56 may populate a sliding window of support with transform coefficients by adding transform coefficients to a support while coding the transform coefficients of the block or sub-block.

In some examples, entropy encoding unit 56 may implement the sliding window of support described above to perform parallel context calculations. For example, entropy encoding unit 56 may introduce a gap between the transform coefficient currently being encoded and the set of transform coefficients included in the support to remove potential context calculation dependencies. That is, entropy encoding unit 56 may skip one or more transform coefficients between the transform coefficient currently being encoded and the transform coefficients in the sliding window that defines the support. Accordingly, entropy encoding unit 56 may calculate context for the transform coefficient currently being encoded as well as context for the skipped transform coefficients in parallel. Entropy encoding unit 56 may adjust the gap between the transform coefficient being encoded and the support based on the number of contexts being calculated in parallel (e.g., increasing the gap in order to accommodate a greater degree of parallelism).

After determining a support, entropy encoding unit 56 may calculate a context for coding a bin of a transform coefficient using the support. After calculating the context, entropy encoding unit 56 may apply context-adaptive binary arithmetic coding to code the bin based on the calculated context. That is, entropy encoding unit 56 may determine a context model based on the determined context and may apply the context model to encode the bin. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

In this manner, video encoder 20 of FIG. 2 represents an example of a video encoder configured to perform a process for coding transform coefficients associated with residual video data in a video coding process that includes defining a context derivation neighborhood for one of a plurality of transform coefficients based on a coefficient scan order, determining a context for the one of the plurality of transform coefficients based on the context derivation neighborhood, and coding the one of the transform coefficients based on the determined context.

Figure 3:
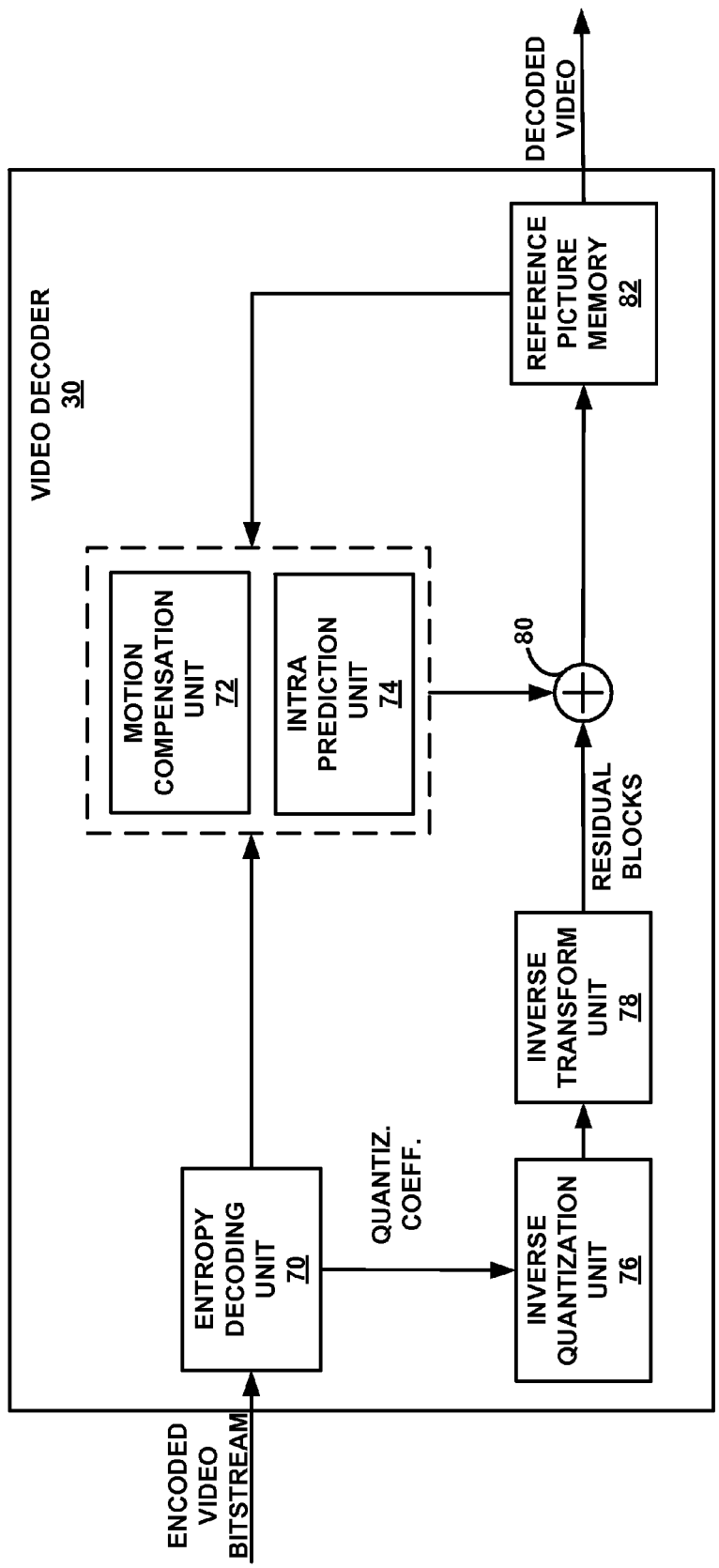
FIG. 3 is a block diagram illustrating an example of video decoder 30 that may implement techniques for performing deriving context.

FIG. 3 is a block diagram illustrating an example of video decoder 30 that may implement techniques for deriving context. As noted above with respect to FIG. 2, while video decoder 30 is described in the context of HEVC coding for purposes of illustration, the techniques of this disclosure are not limited in this way and may be implemented with other current or future coding standards or methods that may require context-adaptive coding of transform coefficients.

In the example of FIG. 3, video decoder 30 includes an entropy decoding unit 70, motion compensation unit 72, intra prediction unit 74, inverse quantization unit 76, inverse transformation unit 78, reference picture memory 82 and summer 80. During the decoding process, video decoder 30 receives an encoded video bitstream that represents video blocks of an encoded video slice and associated syntax elements from video encoder 20. Entropy decoding unit 70 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

For example, by way of background, video decoder 30 may receive compressed video data that has been encapsulated for transmission via a network into so-called "network abstraction layer units" or NAL units. Each NAL unit may include a header that identifies a type of data stored to the NAL unit. There are two types of data that are commonly stored to NAL units. The first type of data stored to a NAL unit is video coding layer (VCL) data, which includes the compressed video data. The second type of data stored to a NAL unit is referred to as non-VCL data, which includes additional information such as parameter sets that define header data common to a large number of NAL units and supplemental enhancement information (SEI). For example, parameter sets may contain the sequence-level header information (e.g., in sequence parameter sets (SPS)) and the infrequently changing picture-level header information (e.g., in picture parameter sets (PPS)). The infrequently changing information contained in the parameter sets does not need to be repeated for each sequence or picture, thereby improving coding efficiency. In addition, the use of parameter sets enables out-of-band transmission of header information, thereby avoiding the need of redundant transmissions for error resilience.

In some examples, video decoder 30 may conform to a predetermined profile and/or level of a video coding standard (such as the emerging HEVC standard or H.264/AVC). For example, in the context of a video coding standard, a profile corresponds to a subset of algorithms, features, or tools and constraints that apply to them. As defined by the H.264 standard, for example, a profile is a subset of the entire bitstream syntax that is specified by the H.264 standard. A level corresponds to the limitations of the decoder resource consumption, such as, for example, decoder memory and computation, which are related to the resolution of the pictures, bit rate, and macroblock (MB) processing rate. A profile may be signaled with a profile_idc (profile indicator) value, while a level may be signaled with a level_idc (level indicator) value.

In any case, entropy decoding unit 70 may entropy decode received quantized transform coefficients as well as other syntax elements and/or symbols. For example, entropy decoding unit 70 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique.

According to aspects of this disclosure, entropy decoding unit 70 may perform techniques of this disclosure to determine a context derivation neighborhood that is based on a transform coefficient scan order. For example, rather than using a position-based support to determine context for entropy decoding bins of binarized transform coefficients (e.g., significance, sign, level, and the like), entropy decoding unit 70 may use a support to determine context that is based on the order in which transform coefficients are scanned (e.g., inverse scanned) during decoding.

In this way, entropy decoding unit 70 may use a sliding window of support to perform context calculation. For example, as entropy decoding unit 70 decodes successive transform coefficients in scan order, entropy decoding unit 70 slides the support used to determine context in the scan order. That is, for each successive transform coefficient being decoded, entropy decoding unit 70 adds a transform coefficient in the scan order to the support. In addition, entropy decoding unit 70 removes the last transform coefficient (relative to the scan order) from the support. Hence, the window defining the support slides along the scan order as the transform coefficients are scanned in the scan order.

Entropy decoding unit 70 may determine a support for calculating context that includes a predetermined number of transform coefficients in scan order (e.g., three, four, five, or the like). In some examples, entropy decoding unit 70 may determine a support having consecutive transform coefficients in scan order.

Entropy decoding unit 70 may reset the support at the beginning of each block or sub-block. For example, entropy decoding unit 70 may begin calculating context for one or more transform coefficients of a block or sub-block with a new support, which, in some examples, may not be based on the scan order. That is, in some examples, entropy decoding unit 70 may use a position-based support to calculate context for one or more transform coefficients in a block and may use a support based on the scan order to calculate context for one or more other transform coefficients in the block or sub-block. In such examples, entropy decoding unit 70 may populate a sliding window of support with transform coefficients by adding transform coefficients to a support while coding the transform coefficients of the block or sub-block.

In some examples, entropy decoding unit 70 may implement the sliding window approach described above to perform parallel context calculations. For example, entropy decoding unit 70 may introduce a gap between the transform coefficient currently being decoded and the set of transform coefficients included in the support to remove potential context calculation dependencies. That is, entropy decoding unit 70 may skip one or more transform coefficients between the transform coefficient currently being decoded and the transform coefficients in the sliding window that defines the support. Accordingly, entropy decoding unit 70 may calculate context for the transform coefficient currently being decoded as well as context for the skipped transform coefficients in parallel. Entropy decoding unit 70 may adjust the gap between the transform coefficient being decoded and the support based on the number of contexts being calculated in parallel (e.g., increasing the gap in order to accommodate a greater degree of parallelism).

After determining a support, entropy decoding unit 70 may calculate a context for coding a bin of a transform coefficient using the support. After calculating the context, entropy decoding unit 70 may apply context-adaptive binary arithmetic coding to decode the bin based on the calculated context. That is, entropy decoding unit 70 may determine a context model based on the determined context and may apply the context model to decode the bin.

When the video slice is coded as an intra-coded (I) slice, intra prediction unit 74 may generate prediction data for a video block of the current video slice based on a signaled intra prediction mode and data from previously decoded blocks of the current frame or picture.

When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain. According to aspects of this disclosure, inverse transform unit 78 may use TUs having the same sizes as corresponding asymmetric SDIP partitions, and thus, different sizes from each other. In other examples, the TUs may each have equal sizes to each other, and thus, potentially be different from the sizes of the asymmetric SDIP partitions (although one of the TUs may be the same size as a corresponding asymmetric SDIP partition). In some examples, the TUs may be represented using a residual quadtree (RQT), which may indicate that one or more of the TUs are smaller than the smallest asymmetric SDIP partition of the current block.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 of FIG. 3 represents an example of a video decoder configured to perform a process for coding transform coefficients associated with residual video data in a video coding process that includes defining a context derivation neighborhood for one of a plurality of transform coefficients based on a coefficient scan order, determining a context for the one of the plurality of transform coefficients based on the context derivation neighborhood, and coding the one of the transform coefficients based on the determined context.

Figure 4A:
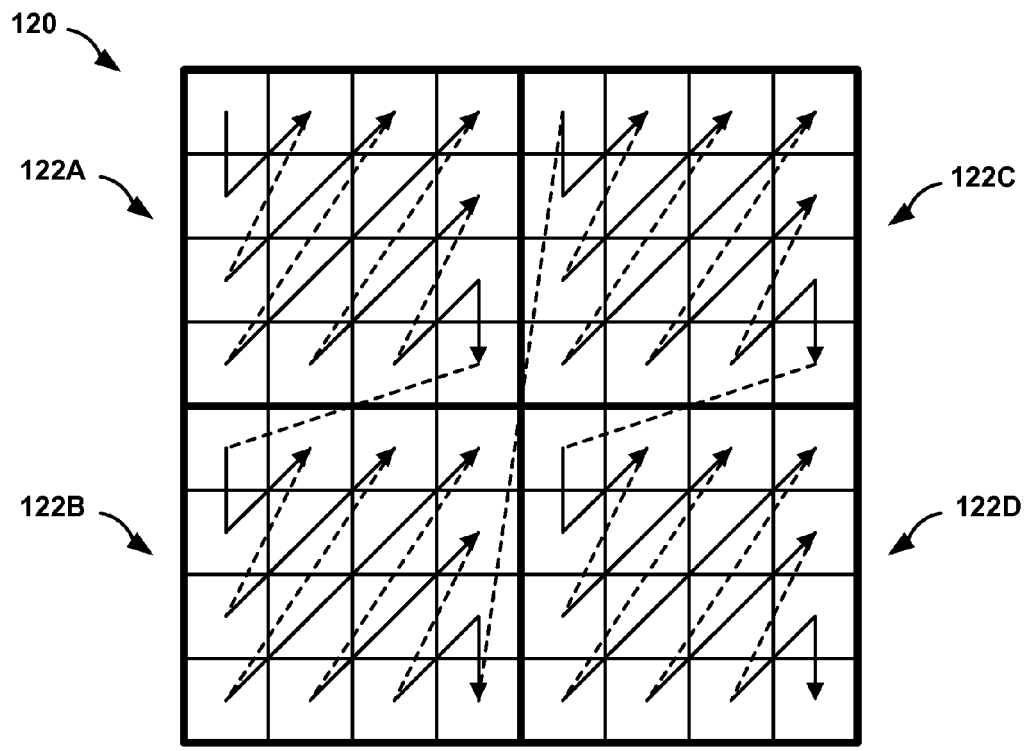
FIGS. 4A and 4B are diagrams that illustrate diagonal scan patterns for scanning transform coefficients associated with a block of video data during coding.
Figure 4B:
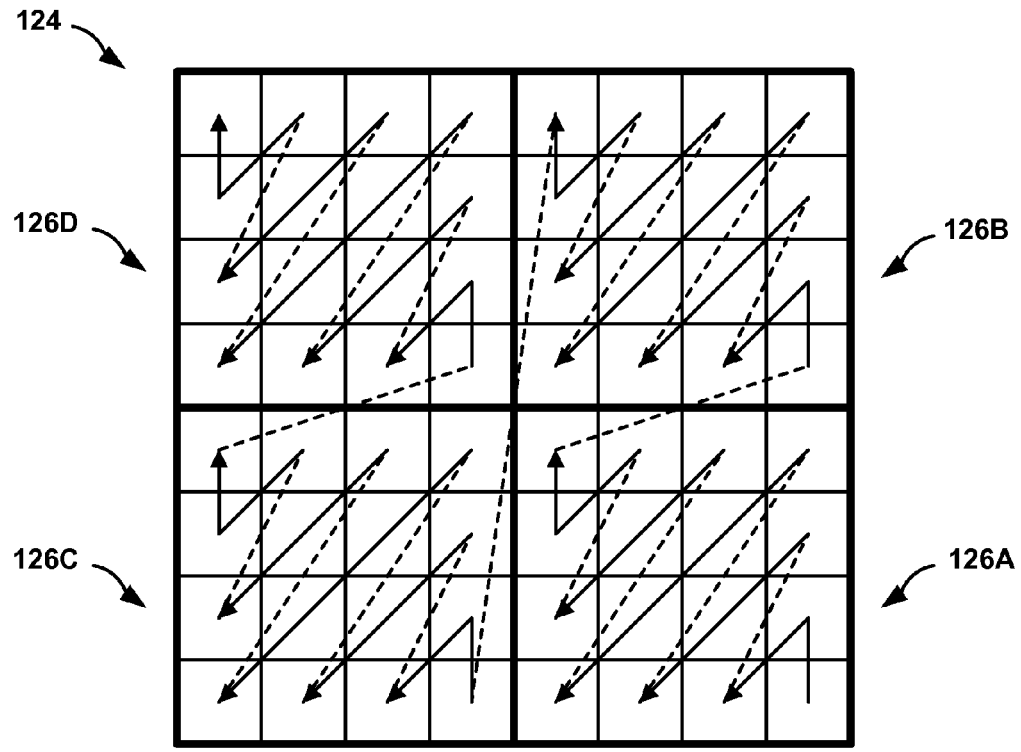

FIGS. 4A and 4B generally illustrate dividing a block of transform coefficients associated with a block of video data into sub-sets in the form of sub-blocks. As noted above, in some examples, a video coder (such as video encoder 20 or video decoder 30) may implement the sub-block structure shown in FIGS. 4A and 4B to reduce hardware and/or software requirements associated with processing relatively large blocks.

With respect to FIG. 4A, the video coder may divide block 120 into sub-blocks 122A, 122B, 122C, and 122D (collectively, sub-blocks 122) while coding block 120. In the example shown in FIG. 4A, first sub-block 122A includes a 4×4 block of transform coefficients positioned in the upper left corner of block 120, a second sub-block 122B includes a 4×4 block of transform coefficients positioned in the lower left corner of block 120, a third sub-block 122C includes a 4×4 block of transform coefficients positioned in the upper right corner of block 120, and a fourth sub-block 122D includes a 4×4 block of transform coefficients positioned in the lower right corner of block 120.

In a similar manner as described with respect to FIG. 4A, the video coder may divide block 124 of FIG. 4B into sub-blocks 126A, 126B, 126C, and 126D while coding block 124. In the example shown in FIG. 4B, first sub-block 126A includes a 4×4 block of transform coefficients positioned in the lower right corner of block 124, a second sub-block 226B includes a 4×4 block of transform coefficients positioned in the upper right corner of block 124, a third sub-block 126C includes a 4×4 block of transform coefficients positioned in the lower left corner of block 124, and a fourth sub-block 126D includes a 4×4 block of transform coefficients positioned in the upper left corner of block 124.

The video coder may code sub-blocks 122 and 126 sequentially. That is, with respect to FIG. 4A, the video coder may code all information associated with transform coefficients (e.g., significance, sign, and level) for one sub-block before coding another sub-block. In this example, the video coder may code all bins associated with sub-block 122A before coding sub-block 122B. The video coder may then code sub-block 122C and 122D. Likewise, with respect to FIG. 4B, the video coder may code all bins associated with sub-block 126A before coding sub-block 126B, sub-block 126C, and sub-block 126D.

In other examples, the video coder may code each bin of data for the entire block 120 and 124 before coding another bin. For example, with respect to FIG. 4A, the video coder may code a significance map for each of sub-blocks 122. The video coder may then code each bin of the transform coefficient levels for each of sub-blocks 122, and so on. Likewise, with respect to FIG. 4B, the video coder may code a significance map for each of sub-blocks 126, followed by transform coefficient levels for each of sub-blocks 126, and so on.

In some examples, the video coder may use a unified scan for scanning transform coefficients. For example, with respect to FIG. 4A, the video coder may code a significance map and coefficient levels of transform coefficients using the same diagonal scan. In other examples, the video coder may code different bins of transform coefficients (e.g., significance, sign, levels, and the like) using scans having different orientations. For example, the video coder may map absolute values of transform coefficient levels maps of each square (or rectangular) 8×8 block and larger onto an ordered set (e.g., vector) of 4×4 sub-blocks by using a forward diagonal, vertical, horizontal, or zig-zag scan. The video coder may then code transform coefficient levels inside each 4×4 sub-block using a reverse diagonal, vertical, horizontal, or zig-zag scan having the opposite orientation as the forward scan. To facilitate a reverse (or inverse) scan shown in FIG. 4B, the video coder may first identify a last significant coefficient of block 124. After identifying the last significant coefficient, the video coder may apply the scan shown in FIG. 4B.

Accordingly, for each 4×4 block, the video coder may code a coded_sub_block_flag, and if there is at least one nonzero coefficient in the sub-block this flag is set to one, otherwise it is equal to zero. If coded_sub_block_flag is nonzero, the video coder may scan each 4×4 sub-block and code significant_coeff_flag for every coefficient indicating significance of the coefficient, as well as the transform coefficient levels. Instead of explicit signaling, the coded_sub_block_flag can be implicitly derived, using neighbor 4×4 sub-block flags or if 4×4 block contains last coefficient or DC.

According to aspects of this disclosure, a video coder (such as video encoder 20 or video decoder 30) may context-adaptively code transform coefficients of the sub-blocks 122 and 126 using a context derivation neighborhood that is based on a transform coefficient scan order. For example, the video coder may use a support for calculating context that includes a sliding window of previously coded transform coefficients in scan order. The video coder may determine a support in the same manner, regardless of the location of the particular transform coefficient in sub-blocks 122 and 126 that is being coded.

For example, with respect to FIG. 4A, the video coder may calculate context for context-adaptively coding a transform coefficient of sub-block 122B using a support that includes the previous five transform coefficients in scan order, some of which may be located in sub-block 122A. Likewise, with respect to FIG. 4B, the video coder may calculate context for context-adaptively coding a transform coefficient of sub-block 126C using a support that includes the previous five transform coefficients in scan order, some of which may be located in sub-block 126B.

The techniques of this disclosure may reduce data access requirements associated with context coding. For example, when using a sliding window to determining the context derivation neighborhood, the video coder does not need to determine the relative location of a transform coefficient in sub-blocks 122 or 126 in order to determine the context for the transform coefficient. Moreover, the video coder only retrieves data associated with one new transform coefficient as the context calculation window descried slides from one transform coefficient to the next.

As noted above, the video coder may apply the same techniques to determine context using a sliding window of support, regardless of the orientation of the scan that is being used to scan the transform coefficients (e.g., zig-zag, diagonal, horizontal, vertical, and the like). Accordingly, while the examples shown in FIGS. 4A and 4B generally illustrate a diagonal scan pattern, the techniques are also applicable to a variety of other scan patterns, including a zig-zag pattern, an adaptive scan order, a horizontal pattern, a vertical pattern, and the like.

In addition, while the examples shown in FIGS. 4A and 4B illustrate 8×8 blocks of transform coefficients with 4×4 sub-blocks, it should be understood that the techniques of this disclosure may be applied to blocks of other sizes, as well as sub-blocks of other sizes. For example, the sliding window for context derivation described above may also be used for 2×8 and/or 8×2 rectangular sub-blocks, which may be used for horizontally or vertically oriented scans, respectively. In such examples, the initial support may be a position-based support or a scan order-based support.

If the video coder uses the same sub-block size for all TUs of a frame (or slice), gains may be achieved in a hardware implementation due to the uniformity achieved with the sub-block sizes. A uniform sub-block size is not necessary, however, to carry out the techniques of this disclosure.

Figure 5:
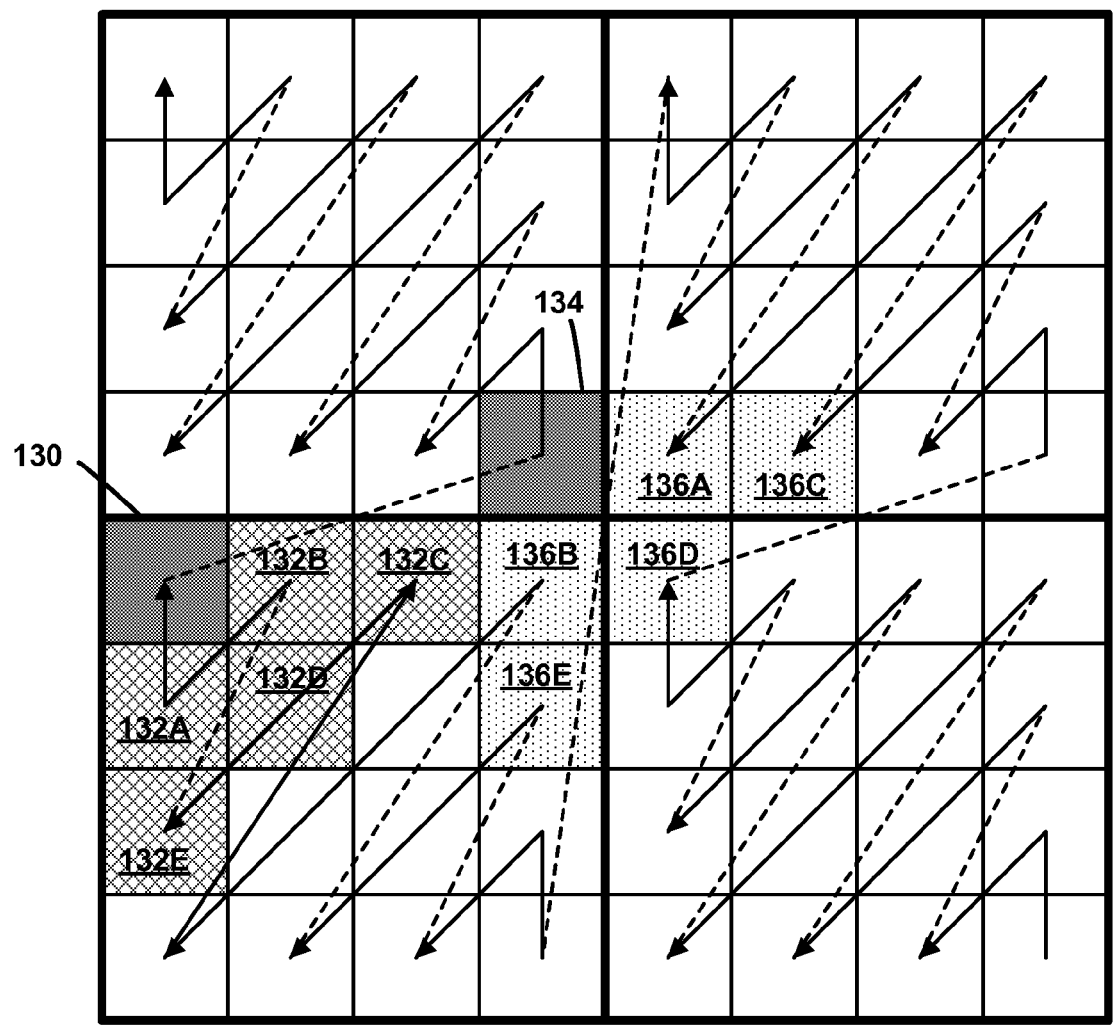
FIG. 5 is a diagram that illustrates a context derivation neighborhood for calculating context.

FIG. 5 generally illustrates a context derivation neighborhood for calculating context. For example, FIG. 5 generally illustrates coding a current or "target" transform coefficient 130 using context derived from context derivation neighborhood 132A, 132B, 132C, 132D, and 132E (collectively, support 132). In one example, as noted above with respect to Equation (1), a video coder (such as video encoder 20 or video decoder 30) may determine a context Ctx based on a sum of the significance flags in every position of support 132, where a significance flag is "1" if the corresponding transform coefficient is nonzero. FIG. 5 also illustrates a second transform coefficient 134 having a second context derivation neighborhood 136A, 136B, 136C, 136D, and 136E (collectively, support 136).

In order to use support 132 for calculating context, the video coder may determine values associated with each of the transform coefficients in positions 132A, 132B, 132C, 132D, and 132E. Determining values associated with five different locations for each coefficient may be relatively computationally intensive. In addition, the video coder may identify whether the transform coefficients in positions 132A, 132B, 132C, 132D, and 132E are located within the same block as transform coefficient 130. Values associated with positions outside of the block may require longer data access times or may be substituted for other values.

In addition, while the second transform coefficient 134 follows the target transform coefficient 130 in scan order, supports 132 and 136 exhibit no overlap. Accordingly, data access requirements calculating contexts using supports 132 and 136 may be relatively high. For example, target transform coefficient 130 is followed immediately by the second target transform coefficient 134 in the scan order. However, support 132 includes an entirely different set of transform coefficients than support 136. Accordingly, the video coder must retrieve data associated with ten transform coefficients to calculate contexts for coding two consecutive transform coefficients.

According to aspects of this disclosure, the video coder may use a scan-order based support to determine context for coding transform coefficients, such as transform coefficients 130 and 134. Accordingly, as described in greater detail with respect to FIGS. 7A and 7B, the video coder may determine contexts for transform coefficients 130 and 134 using supports having one or more of the same transform coefficients. Accordingly, the techniques may reduce the computational and data access expenses described above with respect to position-based supports 132 and 136.

Figure 6:
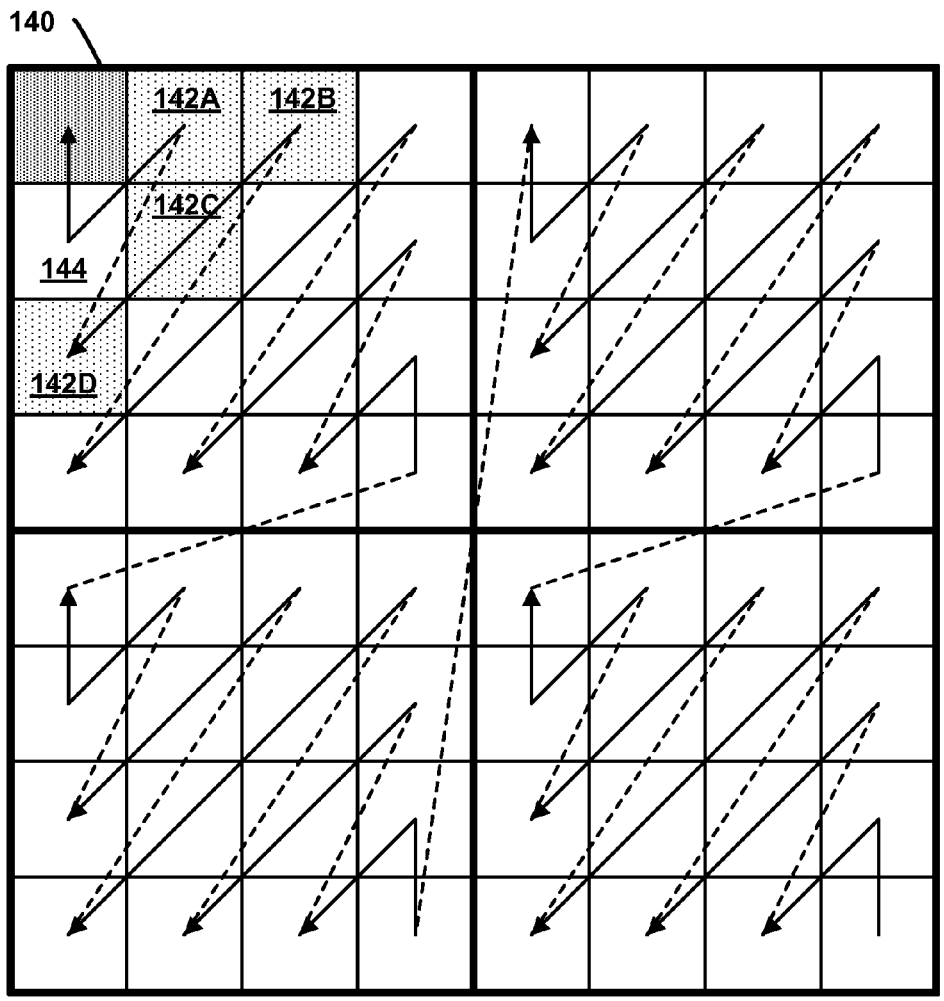
FIG. 6 is a diagram that illustrates a location-based context derivation neighborhood for calculating more than one context in parallel.

FIG. 6 generally illustrates a location-based context derivation neighborhood for calculating more than one context in parallel. In the example shown in FIG. 6, a current or "target" transform coefficient 140 may be coded using context derived from support 142A, 142B, 142C, and 142D (collectively, support 142). In addition, hole 144 is introduced into the support to resolve a context dependency.

For example, a support that includes hole 144 (such as support 132 shown in FIG. 5) may impede the ability of a video coder (such as video encoder 20 or video decoder 30) to calculate contexts for more than one significance flag in parallel in certain locations of the block, because all data in the support must be available (e.g., already coded) when calculating contexts. That is, to calculate a significance context for a particular position, it may be necessary to parse the significance flags of all positions within the support. Such parsing may introduce a delay if there is a requirement to calculate significance contexts of two coefficients in parallel, because the significance flags may be positioned adjacent to each other in scan order.

In an example for purposes of illustration, the video coder may attempt to calculate context for coding target transform coefficient 140 in parallel with a transform coefficient in the preceding position in scan order, i.e., transform coefficient in the position of hole 144. However, in this example, the video coder must wait for the transform coefficient in the position of hole 144 to finish coding before determining the context for target transform coefficient 140, because target transform coefficient would depend on the value of the transform coefficient at hole 144. That is, the value of the transform coefficient at hole 144 must be known (coded) before the value can be used, for example, in the context model summation shown in Equation (1). The delay associated with this context dependency reduces the ability of the video coder to efficiently calculate contexts in parallel.

Accordingly, a video coder (such as video encoder 20 or video decoder 30) using a position-based support may introduce hole 144 into support 142 to remove a position from support 142. In this example, the transform coefficient associated with hole 144 may be skipped and not taken into account for the context calculation (i.e., assumed to be zero), thereby removing the context dependency. The technique of introducing so-called holes into support is described in U.S. patent application Ser. No. 13/738,565, filed Jan. 10, 2013.

However, introducing holes into a position-based support for parallel context calculation may introduce complexity to the context determination process. For example, as noted above, the video coder may be required to determine the locations of the transform coefficients being coded as well as the number of contexts being calculated in parallel to select an appropriate support. Additional complexity may be added when implementing a higher degree of parallelization. For example, two bin CABAC parallelization (e.g., calculating two contexts in parallel) may require the video coder to change the support for two positions in each 4×4 sub-block. Increasing the parallelization may also increase the number of different supports with holes that are required.

According to aspects of this disclosure, the video coder may perform parallel context calculations using a sliding window for context derivation. For example, the video coder may introduce a gap between a transform coefficient being coded and the set of transform coefficients of the support in scan order. That is, the video coder may skip one or more transform coefficients between the transform coefficient being coded and the transform coefficients in the sliding window that defines the support. The gap between the transform coefficient being coded and the transform coefficients of the support may remove the context dependencies described above.

According to aspects of this disclosure, the number of transform coefficients in the gap between the transform coefficient being coded and the associated support may be increased to accommodate additional parallel context calculations. For example, a gap of two transform coefficients may allow three contexts to be calculated in parallel, and so on. Accordingly, the video coder does not need to determine special position-based supports according to the number of contexts being calculated in parallel.

Figure 7A:
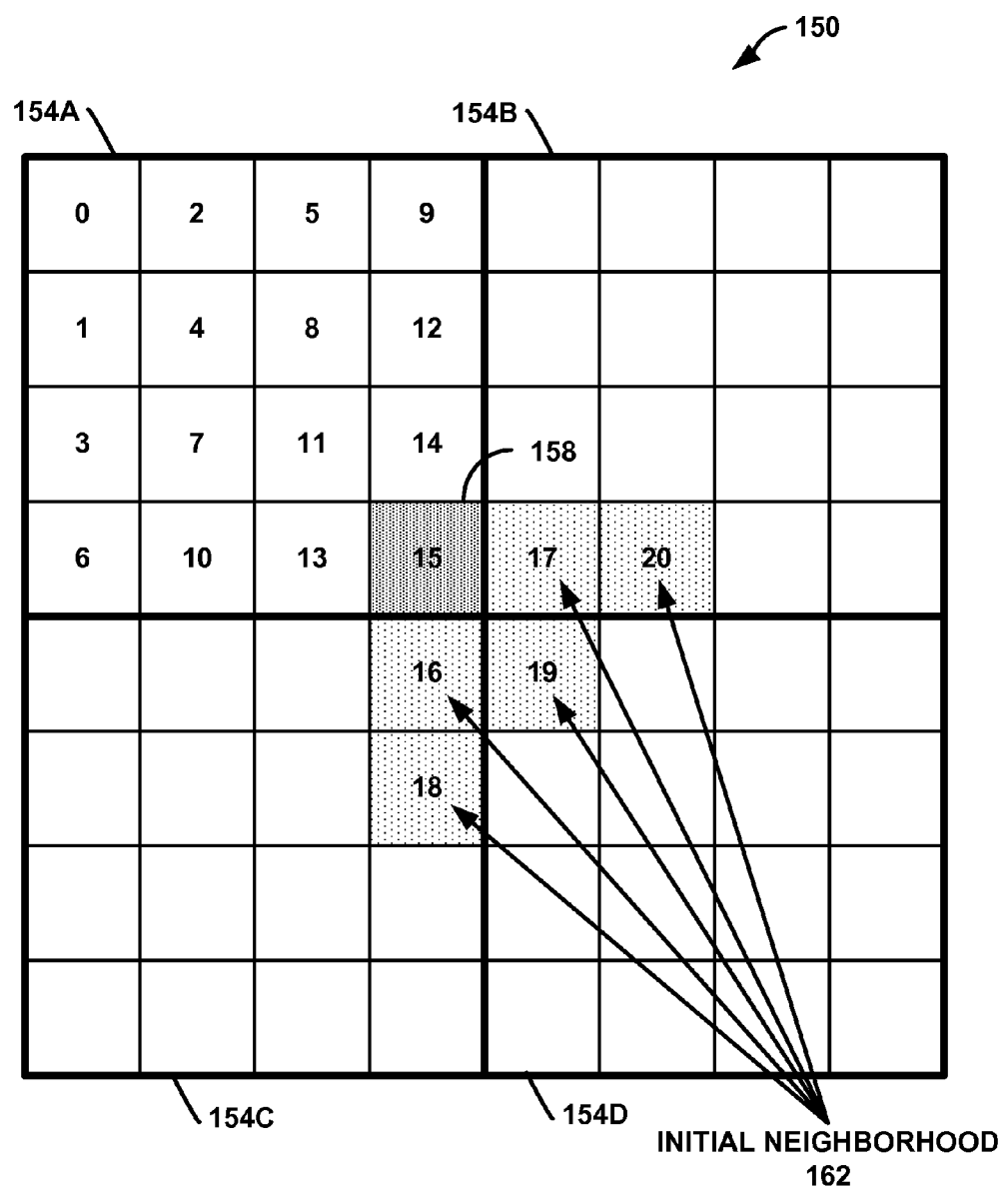
FIGS. 7A and 7B are diagrams that illustrate an example context derivation neighborhood sliding window that is based on scan order, according to aspects of this disclosure.
Figure 7B:
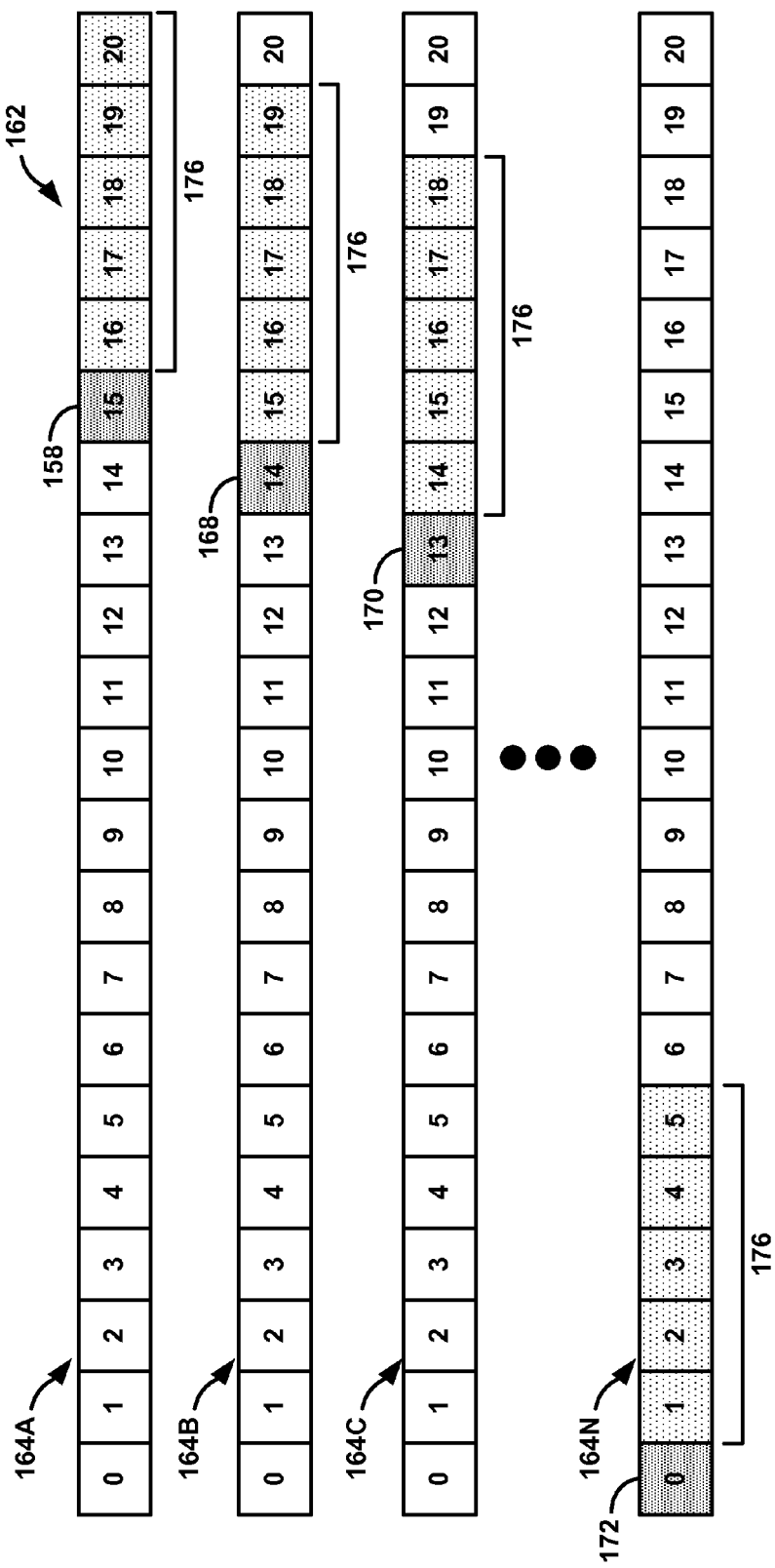

FIGS. 7A and 7B are diagrams illustrating an example context derivation neighborhood sliding window that is based on scan order, according to aspects of this disclosure. The example of FIG. 7A includes a block of transform coefficients 150 having sub-blocks 154A-154D (collectively, sub-blocks 154), a first transform coefficient 158 (transform coefficient 15) of sub-block 154A, and an initial context derivation neighborhood (support) 162 for determining context for the first transform coefficient 158. In general, the numbers (0-15) of sub-block 154A correspond to a reverse diagonal scan order such as that shown in FIG. 6. That is, the video coder may scan the transform coefficients of sub-block 154A in sequence from first transform coefficient 158 (transform coefficient 15) to transform coefficient 0.

According to aspects of this disclosure, the video coder may use a combination of one or more position-based supports and scan order-based supports to determine contexts for coding transform coefficients 0-15 of sub-block 154A. For example, the video coder may use initial support 162 to determine context for first transform coefficient 158 (transform coefficient 15). Initial support 162 may be positioned based. That is, the video coder may select initial support 162 based on the relative positions of the transform coefficients included in initial support 162 with respect to first transform coefficient 158.

For determining context for the remaining transform coefficients of sub-block 154A, the video coder may populate a sliding window of support. For example, in general, the video coder may calculate context for a transform coefficient at a given position n using a support that depends on previously scanned coefficients, e.g., from n+i to n+j, where i is coded prior to j. Assuming five transform coefficients are used for support, the video coder may calculate context for a transform coefficient at a given position n using a support that depends on previously scanned coefficients n+1 to n+5. Hence, if a transform coefficient has a scan order position n, the context derivation neighborhood may comprise transform coefficients at scan order positions n+1 to n+5. In the example of FIGS. 7A and 7B, when n+5 is equal to 15 or less, the support for determining context depends solely on the scan order. That is, as described in greater detail with respect to FIG. 7B below, the video coder may include at least one transform coefficient from initial support 162 for calculating context for the first five transform coefficients (transform coefficients 15-11). However, as the video coder calculates context for each successive transform coefficient, the video coder populates the sliding window of support with a transform coefficient in the scan order and removes one of the transform coefficients from initial support 162 from the relative end of the sliding window of support.

For example, assuming the five point support noted above, the video coder may determine context for the second transform coefficient of sub-block 154A in scan order using four transform coefficients from initial support 162 and one transform coefficient from the scan order (transform coefficient 15). Likewise, the video coder may determine context for the third transform coefficient of sub-block 154A in scan order using three transform coefficients from initial support 162 and two transform coefficients from the scan order (transform coefficients 14 and 15), and so on until the sliding window is fully populated.

In some examples, the video coder may reset the support after coding each block or sub-block. For example, after coding sub-block 154C (assuming the reverse scan described above) the video coder may reset the support before coding sub-block 154A. The video coder may reset the support by determining an initial support (such as initial support 162), which may be positioned-based. Hence, the initial window at the start of a sub-block, i.e., for the first coefficient in the sub-block, may use a conventional context neighborhood, such as that shown in FIG. 5.

FIG. 7B illustrates a context derivation neighborhood sliding window in greater detail. For example, FIG. 7B illustrates strings of transform coefficients 164A-164N that correspond to like-numbered transform coefficients shown in FIG. 7A. String 164A illustrates coding the first transform coefficient 158 with initial support 162. Each successive string 164B-164N illustrates successive transform coefficient coding operations. That is, string 164B illustrates coding a second transform coefficient 168 of sub-block 154A (transform coefficient 14) in scan order. In addition, string 164C illustrates coding a third transform coefficient 170 of sub-block 154A (transform coefficient 13) in scan order, and string 164N illustrates coding a final transform coefficient 172 of sub-block 154A (transform coefficient 0) in scan order.

As shown in FIG. 7B, sliding window 176 defines the support for calculating context for the transform coefficients of the respective strings 164A-164N, e.g., for significance coding or level coding for CABAC by entropy coding unit 56 or entropy decoding unit 70, as applicable. For example, as noted above with respect to FIG. 7A, the video coder calculates context for initial transform coefficient 158 using initial support 162. Next, as indicated by string 164B, the video coder processes second transform coefficient 168 and determines a support that includes transform coefficients 15-19. That is, the video coder moves sliding window 176 one position to include transform coefficient 15 (the previously coded transform coefficient) in the support while also removing transform coefficient 20 from the support.

Likewise, as indicated by string 164C, the video coder processes third transform coefficient 170 and determines a support that includes transform coefficients 14-18. That is, the video coder moves sliding window 176 one position to include transform coefficient 14 (the previously coded transform coefficient) in the support while also removing transform coefficient 190 from the support. The video coder may continue to code the transform coefficients of sub-block 154A in this way until the entire block has been coded. For example, as indicated by string 164N, the video coder processes final transform coefficient 172 and determines a support that includes transform coefficients 1-5.

When transform coefficient position n+5 is less than 15, the support defined by sliding window 176 depends solely on the scan order and does not include transform coefficients of initial support 162 (which may be selected in a manner other than by scan order, e.g., based on spatial neighbor positions). That is, in the example shown in FIG. 7B, after coding transform coefficient 11, sliding window 176 includes transform coefficients based solely on the scan order (transform coefficients 11-15).

In this way, the techniques of this disclosure include using a sliding window to define a support for coding transform coefficients. The techniques of this disclosure may provide an easier computation of context, relative to other context calculation schemes. For example, reduces data access requirements, as the video coder only retrieves data associated with one new transform coefficient for each successive transform coefficient being coded. In addition, the video coder does not change the manner in which the support is defined based on the particular location of the transform coefficient being coded or the orientation of the scan.

Moreover, the video coder may also increase the size of the support for context coding with relative low computational cost. For example, even as the size of the 1-D vector of support increases the computation for each context is similar, because only one new transform coefficient is considered in the support at each transform coefficient position in scan order. In this way, the number of transform coefficients included in the support may be increased from five to a greater number with relatively low computational cost. In contrast, increasing the number of transform coefficients in a support based on a two-dimensional location (e.g., as in a position-based support) requires a relatively significant increase in cost due to the number of conditions that are checked and the memory access requirements.

Accordingly, while the example shown in FIGS. 7A and 7B generally illustrate a support that includes five values, in other examples, a support may include more or fewer than five values without departing from the techniques of this disclosure. The data shown in FIGS. 7A and 7B may be stored and processed in 1-D order to speed processing. As noted above, while a combination of position-based and scan order-based supports may be used to determine contexts, another example may include a strictly scan-order based approach. In such an example, the video coder may populate the initial support with predefined values.

Figure 8:
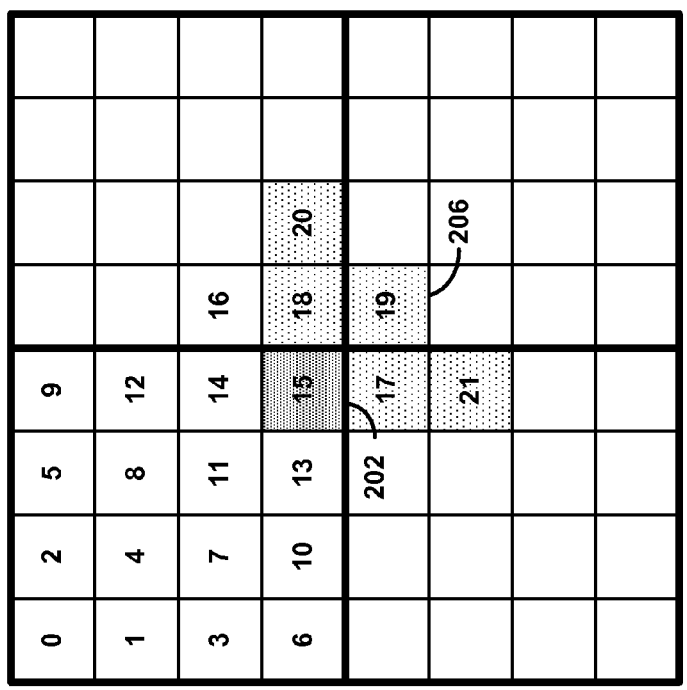
FIG. 8 is a diagram that illustrates an example context derivation neighborhood sliding window that is based on scan order and supports derivation of context for two bins in parallel, according to aspects of this disclosure.
Figure 8:
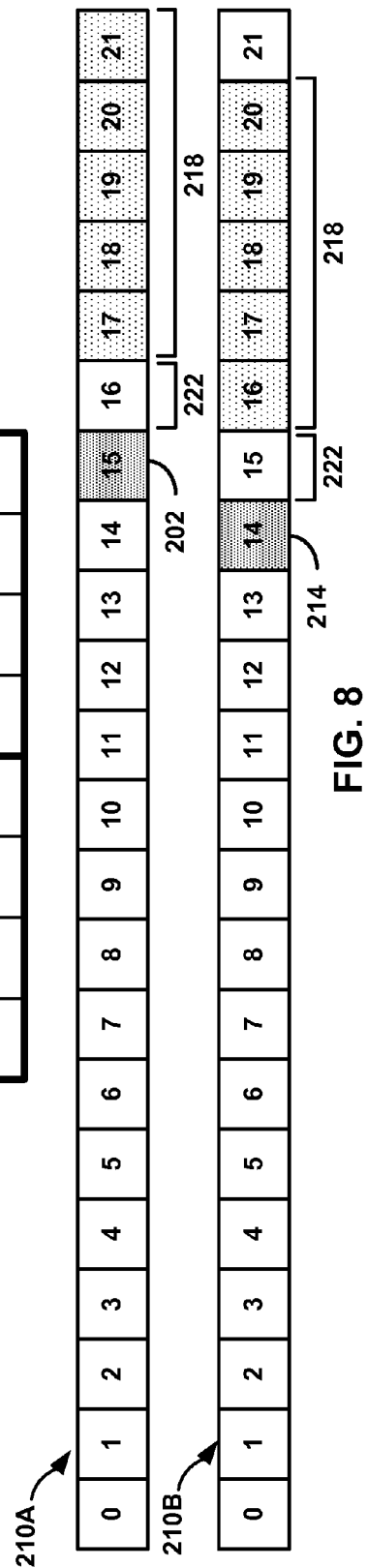

FIG. 8 is a diagram illustrating an example context derivation neighborhood sliding window that is based on scan order and supports derivation of context for two bins in parallel, according to aspects of this disclosure. For example, FIG. 8 includes a block of transform coefficients 200, a first transform coefficient 202 (transform coefficient 15), and an initial context derivation neighborhood (support) 206 for determining context for the first transform coefficient 202 (shaded transform coefficients 17-21). In general, the numbers (0-15) of the transform coefficients correspond to a reverse diagonal scan order, as described above with respect to FIGS. 7A and 7B.

In addition, FIG. 8 includes strings of transform coefficients 210A and 210B that correspond to like-numbered transform coefficients of block 200. String 210A illustrates coding first transform coefficient 202 with initial support 206. String 210B illustrates coding a second transform coefficient 214 of block 200 (transform coefficient 14) in scan order.

Sliding window 218 defines the support for calculating context for the transform coefficients of the respective strings 210A and 210B, e.g., for significance coding or level coding for CABAC by entropy coding unit 56 or entropy decoding unit 70, as applicable. For example, the video coder calculates context for first transform coefficient 202 using initial support 206 that includes transform coefficients 17-21. Next, as indicated by string 210B, the video coder processes second transform coefficient 214 and determines a support that includes transform coefficients 16-20. That is, the video coder moves sliding window 218 one position to include transform coefficient 16 (the previously coded transform coefficient) in the support while also removing transform coefficient 21 from the support.

According to aspects of this disclosure, the video coder may insert gap 222 between a transform coefficient being coded and sliding window 218 to remove context dependencies. For example, FIG. 8 illustrates an arrangement for parallel context calculation of two bins. That is, by introducing gap 222 the video coder removes a context dependency with respect to the previous transform coefficient in scan order. Accordingly, the video coder may calculate context, for example, for coding second transform coefficient 214 in parallel with first transform coefficient 202, because support for second transform coefficient 214 (as defined by sliding window 218) does not depend on first transform coefficient 202.

Accordingly, as shown in FIG. 8, for two bin parallelization, a support for coding a current transform coefficient does not include the previously coded transform coefficient in scan order. The video coder may adjust the number of contexts that may be calculated in parallel by adjusting gap 222. For example, for three bin parallelization a support for coding a current transform coefficient does not include the previous two transform coefficients in scan order. That is, the video coder may increase the width of gap 222 from one transform coefficient to two transform coefficients. Accordingly, the video coder may calculate contexts for the current transform coefficient as well as the previous two transform coefficients in scan order (the transform coefficients associated with gap 222) in parallel. Parallel context calculation capability may be added by increasing the number of transform coefficients in gap 222.

In this way, according to aspects of this disclosure, the video coder does not need to define special supports for each transform coefficient position when perform parallel context calculation. In addition, there is no additional computational burden associated with support derivation when increasing the number of contexts calculated in parallel.

Figure 9:
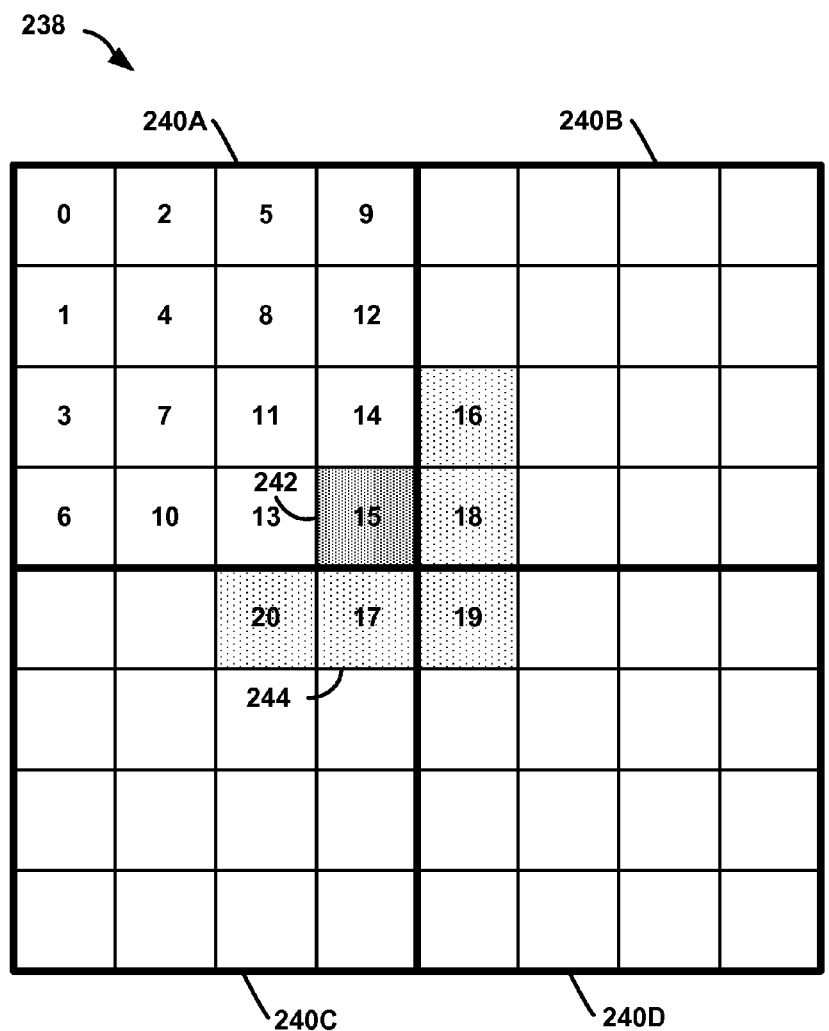
FIG. 9 is a diagram that illustrates an example initial context derivation neighborhood, according to aspects of this disclosure.

FIG. 9 is a conceptual diagram illustrating an example initial context derivation neighborhood, according to aspects of this disclosure. In some examples, as described in greater detail below, the initial context derivation neighborhood shown in FIG. 9 may minimize memory usage associated with context coding.

The example of FIG. 9 includes a block of transform coefficients 238 having sub-blocks 240A-240D (collectively, sub-blocks 240), a first transform coefficient 242 (transform coefficient 15) of sub-block 240A, and an initial context derivation neighborhood (support) 244 for determining context for the first transform coefficient 242 (shaded transform coefficients 16-20). In general, the numbers (0-15) of sub-block 240A correspond to a reverse diagonal scan order such as that shown in FIG. 6. That is, the video coder may scan the transform coefficients of sub-block 240A in sequence from first transform coefficient 242 (transform coefficient 15) to transform coefficient 0.

Initial support 244 may minimize the amount of data that is stored by a video coder (such as video encoder 20 or video decoder 30) for context coding. For example, as shown in FIG. 9, initial support 244 includes transform coefficients located in positions from only one row and one column of surrounding sub-blocks 240B-240D. Accordingly, the video coder only stores the data from one row and one column of surrounding sub-blocks 240B-240D for purposes of context derivation.

In this way, the video coder may realize a memory savings when compared with using context derivation neighborhoods having positions in more rows and columns. For example, supports 132 and 136 shown in FIG. 5 include positions in two rows and two columns of surrounding transform coefficients. Such supports 132 and 136 require data from both rows and both columns to be stored for purposes of context derivation. Accordingly, initial support 244 illustrates a reduction in memory requirements, because only one row and one column of data must be stored.

Initial support 244 of FIG. 9 is provided as merely one example. In other examples, the video coder may further restrict the locations from which an initial support is derived to further reduce memory consumption.

Figure 10:
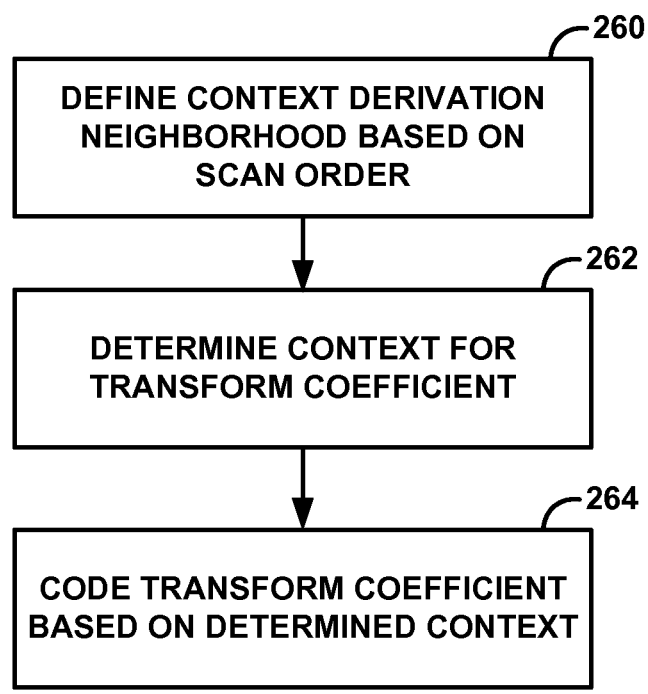
FIG. 10 is a flow diagram that illustrates a technique of coding transform coefficients using context derivation neighborhood that is based on a scan order, according to aspects of this disclosure.

FIG. 10 is a flow diagram illustrating a technique of coding transform coefficients using context derivation neighborhood that is based on a scan order, according to aspects of this disclosure. The example shown in FIG. 10 is generally described as being performed by a video coder. It should be understood that, in some examples, the method of FIG. 10 may be carried out by video encoder 20 (FIGS. 1 and 2), video decoder (FIGS. 1 and 3), or a variety of other processors, processing units, hardware-based coding units such as encoder/decoders (CODECs), and the like.

In addition, while FIG. 10 is generally described with respect to a transform coefficient, it should be understood that the techniques described with respect to FIG. 10 (as well as elsewhere in this disclosure) may be applied to code binarized transform coefficients having multiple bins of data. Accordingly, the techniques may be performed recursively until all of the context coded bins of a transform coefficient have been coded, as described above. In addition, it should be understood that while FIG. 10 is described with respect to context coding, one or more bins of a transform coefficient may be bypass coded, as described above.

In the example of FIG. 10, a video coder defines a context derivation neighborhood (support) for coding a transform coefficient that is based on a scan order (260). For example, according to aspects of this disclosure, the video coder may use a sliding window to determine the support. The sliding window may include a predetermined set of transform coefficients in scan order that were coded previously to the transform coefficient currently being coded. That is, for a transform coefficient currently being coded having position (n) in a block or sub-block, the sliding window may include transform coefficients in positions (n+1) to (n+m), where m is a non-zero integer and the transform coefficient in position (n) is coded after the transform coefficients in positions (n+1) to (n+m).

The video coder may then determine context for coding the transform coefficient (262). As noted above, the video coder may calculate the context, in an example for coding significance flags, by determining a sum of the significance flags in the positions of the support. In examples in which the video coder calculates context for more than one transform coefficient in parallel, the video coder may also calculate contexts for other transform coefficients in parallel with the context for the current transform coefficient flag. According to aspects of this disclosure, the video coder may insert a gap between the transform coefficient being coded and the support to enable such parallel context calculation, as described above with respect to FIG. 8.

The video coder also codes the transform coefficient based on the determined context (264). For example, the video coder may CABAC code the transform coefficient. Accordingly, the video coder may use the determined context to identify a context model for entropy coding the transform coefficient. At a video encoder (such as video encoder 20) the video encoder may use the context model to entropy encode the transform coefficient, thereby including an indication of the value of related bins of the transform coefficient in an encoded bitstream. At a video decoder (such as video decoder 30) the video decoder may use the context model to entropy decode bins of the transform coefficient, thereby parsing bins from an encoded bitstream.

Figure 11:
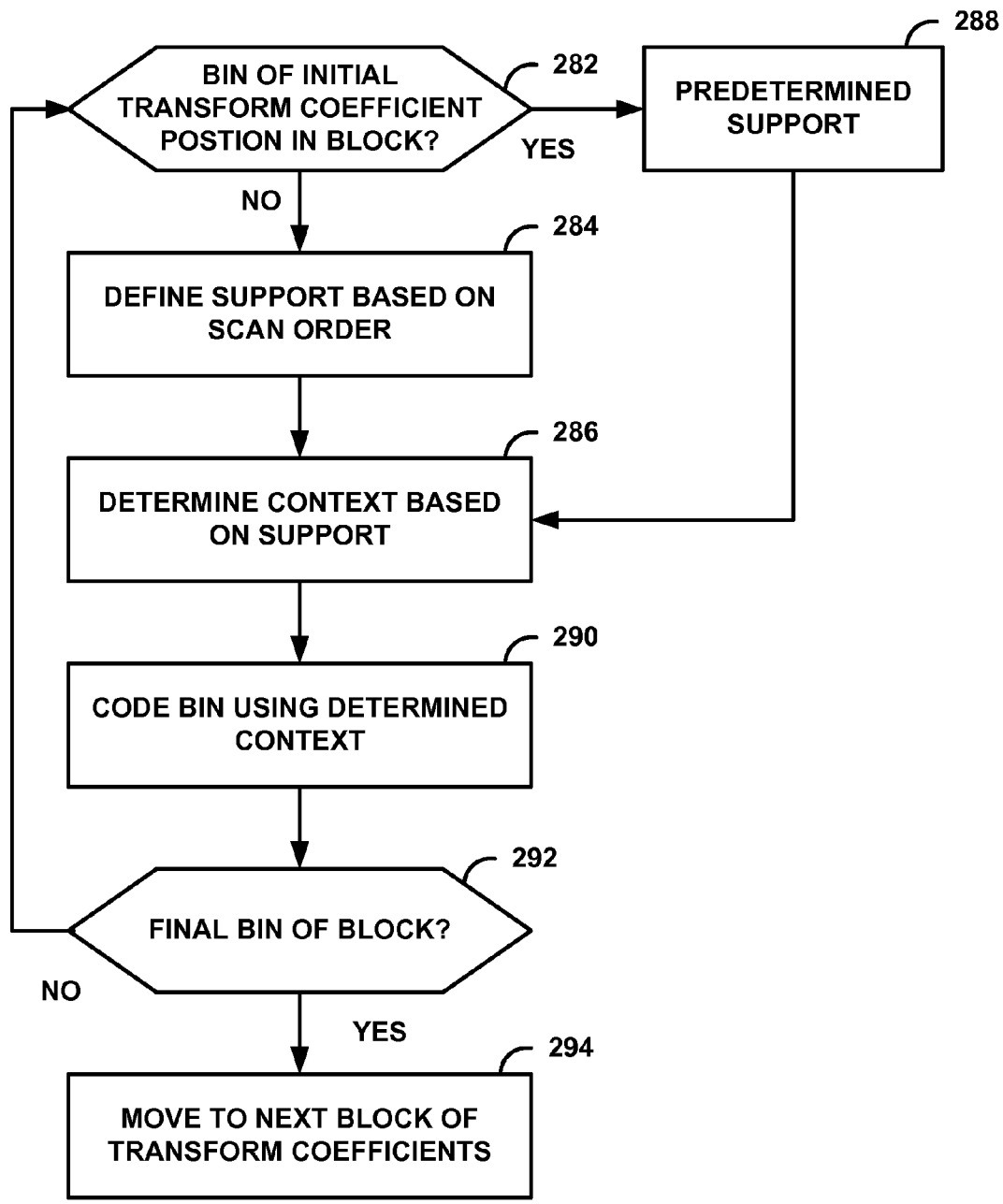
FIG. 11 is a flow diagram that illustrates a technique of coding transform coefficients using context derivation neighborhood that is based on a scan order, according to aspects of this disclosure.

FIG. 11 is a flow diagram illustrating a technique of coding transform coefficients using context derivation neighborhood that is based on a scan order, according to aspects of this disclosure. The example shown in FIG. 11 is generally described as being performed by a video coder. It should be understood that, in some examples, the method of FIG. 11 may be carried out by video encoder 20 (FIGS. 1 and 2), video decoder (FIGS. 1 and 3), or a variety of other processors, processing units, hardware-based coding units such as encoder/decoders (CODECs), and the like.

In the example of FIG. 11, the video coder determines whether the bin currently being coded is associated with an initial transform coefficient position in a block or sub-block of video data (282). That is, the video coder may determine whether the bin currently being coded is associated with the first transform coefficient being scanned in a block or sub-block of video data.

If the bin is not associated with the initial transform coefficient, the video coder defines a context derivation neighborhood (support) for coding the bin that is at least partially based on a scan order (284). For example, according to aspects of this disclosure, the video coder may use a sliding window to determine the support for coding bins of transform coefficients other than the initial transform coefficient. As noted above, the sliding window may include a predetermined set of transform coefficients in scan order (as well as, in some examples, one or more transform coefficients from an initial predetermined support) that were coded previously to the transform coefficient currently being coded. That is, the video coder may populate the sliding window with transform coefficients in scan order one transform coefficient at a time, while also removing transform coefficients from the initial predetermined support.

The video coder may then determine context for coding the bin (286). As noted above, the video coder may calculate the context, in an example for coding significance flags, by determining a sum of the significance flags in the positions of the support.

If the bin being coded is associated with the initial transform coefficient in a block or sub-block, the video coder may use a predetermined, position-based support for coding the bin (288). For example, the video coder may use a support that includes a predetermined number of transform coefficients in predetermined locations with respect to the relative location of the transform coefficient being coded. In some examples, this initial support may be formed to minimize the amount of data that is stored for the predetermined support, as described above with respect to FIG. 9. The video coder may then determine context for coding the bin (286).

The video coder also codes the bin based on the determined context (290). For example, the video coder may CABAC code the transform coefficient. Accordingly, the video coder may use the determined context to identify a context model for entropy coding the bin. At a video encoder (such as video encoder 20) the video encoder may use the context model to entropy encode the bin, thereby including an indication of the value of the bin in an encoded bitstream. At a video decoder (such as video decoder 30) the video decoder may use the context model to entropy decode the bin, thereby parsing the bin from an encoded bitstream. In addition, if the bin is the final bin of a transform coefficient, the video decoder may binarize (reconstruct) the bins to determine the value of the transform coefficient associated with the bins.

The video coder may also determine whether the coded bin was the final bin of the final transform coefficient of a block or sub-block of transform coefficients (292). If the coded bin was not the final bin of the final transform coefficient in a block or sub-block, the video coder may return to determining whether the next bin being coded is associated with an initial transform coefficient position in the block or sub-block (282). If the next bin being coded is associated with the initial transform coefficient position in the block or sub-block, the video coder may reset the support using the predetermined support described above with respect to step 288. If the coded bin was the final bin of the final transform coefficient in the block or sub-block, the video coder may move to the next block or sub-block of transform coefficients (294).

Certain aspects of this disclosure have been described with respect to the developing HEVC standard for purposes of illustration. However, the techniques described in this disclosure may be useful for other video coding processes, such as those defined according to H.264 or other standard or proprietary video coding processes not yet developed.

In addition, while certain examples above have been described with respect to coding transform coefficients (e.g., sign, significance, level, and the like), aspects of this disclosure may be applied to coding bins associated with other values or symbols. For example, the techniques for determining a set of support may be applied to a variety of context-adaptive entropy coding schemes for coding a variety of bins, including bins associated with transform coefficients as well as other symbols.

Moreover, references to an initial five point support are provided for purposes of example. Other supports having more or fewer than five elements may also be used in accordance with the techniques described herein.

A video coder, as described in this disclosure, may refer to a video encoder or a video decoder (such as, for example, video encoder 20 or video decoder 30). Similarly, a video coding unit may refer to a video encoder or a video decoder. Likewise, video coding may refer to video encoding or video decoding.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding transform coefficients associated with residual video data in a video coding process, the method comprising:
defining a context derivation neighborhood for one of a plurality of transform coefficients using a sliding window that is determined based on a transform coefficient scan order and that includes a set of transform coefficients scanned prior to the one of the plurality of transform coefficients in the transform coefficient scan order, wherein the context derivation neighborhood indicates one or more transform coefficients of the plurality of transform coefficients from which a context is derived;
determining the context for the one of the plurality of transform coefficients based on the context derivation neighborhood; and
coding the one of the plurality of transform coefficients based on the determined context.

2. The method of claim 1, further comprising moving the sliding window one position in the transform coefficient scan order after coding the one of the plurality of transform coefficients such that the sliding window includes the one of the plurality of transform coefficients.

3. The method of claim 1, wherein the set of transform coefficients comprises a set of consecutive transform coefficients in the coefficient scan order.

4. The method of claim 1, wherein the one of the plurality of transform coefficients has a scan order position n, and the context derivation neighborhood comprises transform coefficients at scan order positions n+i to n+j, wherein scan order position n is scanned after scan order positions n+i to n+j, and scan order position n+j is scanned after scan order position n+i.

5. The method of claim 1, further comprising:
defining context derivation neighborhoods for other transform coefficients of the plurality of transform coefficients based on the transform coefficient scan order,
wherein each of the context derivation neighborhoods corresponds to a sliding window along the scan order relative to the respective coefficient to be coded.

6. The method of claim 1, wherein defining the context derivation neighborhood for the one of the plurality of transform coefficients comprises including a gap of at least one transform coefficient in the transform coefficient scan order between the one of the plurality of transform coefficients and transform coefficients associated with the context derivation neighborhood.

7. The method of claim 6, wherein the transform coefficient has a scan order position n, and the context derivation neighborhood comprises transform coefficients at scan order positions n+2 to n+6, wherein scan order position n is scanned after scan order positions n+2 to n+6.

8. The method of claim 1,
wherein the plurality of transform coefficients are associated with a sub-block of transform coefficients;
further comprising defining an initial context derivation neighborhood that is not based on the scan order for an initial transform coefficient of the plurality of transform coefficients, wherein the initial transform coefficient is scanned first in the sub-block in the transform coefficient scan order; and
coding the initial transform coefficient based on the initial context derivation neighborhood.

9. The method of claim 1, wherein the context is a CABAC context, and wherein coding comprises coding the one of the plurality of transform coefficients using a CABAC process.

10. The method of claim 1, wherein coding the one of the plurality of transform coefficients comprises decoding the one of the plurality of transform coefficients.

11. The method of claim 1, wherein coding the one of the plurality of transform coefficients comprises encoding the one of the plurality of transform coefficients.

12. An apparatus for coding transform coefficients associated with residual video data in a video coding process, the apparatus comprising one or more processors configured to:
define a context derivation neighborhood for one of a plurality of transform coefficients using a sliding window that is determined based on a transform coefficient scan order and that includes a set of transform coefficients scanned prior to the one of the plurality of transform coefficients in the transform coefficient scan order, wherein the context derivation neighborhood indicates one or more transform coefficients of the plurality of transform coefficients from which a context is derived;
determine the context for the one of the plurality of transform coefficients based on the context derivation neighborhood; and
code the one of the plurality of transform coefficients based on the determined context.

13. The apparatus of claim 12, wherein the one or more processors are further configured to move the sliding window one position in the transform coefficient scan order after coding the one of the plurality of transform coefficients such that the sliding window includes the one of the plurality of transform coefficients.

14. The apparatus of claim 12, wherein the set of transform coefficients comprises a set of consecutive transform coefficients in the coefficient scan order.

15. The apparatus of claim 12, wherein the one of the plurality of transform coefficients has a scan order position n, and the context derivation neighborhood comprises transform coefficients at scan order positions n+i to n+j, wherein scan order position n is scanned after scan order positions n+i to n+j, and scan order position n+j is scanned after scan order position n+i.

16. The apparatus of claim 12, wherein the one or more processors are further configured to:
define context derivation neighborhoods for other transform coefficients of the plurality of transform coefficients based on the transform coefficient scan order,
wherein each of the context derivation neighborhoods corresponds to a sliding window along the scan order relative to the respective coefficient to be coded.

17. The apparatus of claim 12, wherein to define the context derivation neighborhood for the one of the plurality of transform coefficients, the one or more processors are configured to include a gap of at least one transform coefficient in the transform coefficient scan order between the one of the plurality of transform coefficients and transform coefficients associated with the context derivation neighborhood.

18. The apparatus of claim 17, wherein the transform coefficient has a scan order position n, and the context derivation neighborhood comprises transform coefficients at scan order positions n+2 to n+6, wherein scan order position n is scanned after scan order positions n+2 to n+6.

19. The apparatus of claim 12,
wherein the plurality of transform coefficients are associated with a sub-block of transform coefficients;
wherein the one or more processors are further configured to define an initial context derivation neighborhood that is not based on the scan order for an initial transform coefficient of the plurality of transform coefficients, wherein the initial transform coefficient is scanned first in the sub-block in the transform coefficient scan order; and
code the initial transform coefficient based on the initial context derivation neighborhood.

20. The apparatus of claim 12, wherein the context is a CABAC context, and wherein to code, the one or more processors are configured to code the one of the plurality of transform coefficients using a CABAC process.

21. The apparatus of claim 12, wherein to code the one of the plurality of transform coefficients, the one or more processors are configured to decode the one of the plurality of transform coefficients.

22. The apparatus of claim 12, wherein to code the one of the plurality of transform coefficients, the one or more processors are configured to encode the one of the plurality of transform coefficients.

23. An apparatus for coding transform coefficients associated with residual video data in a video coding process, the apparatus comprising:
means for defining a context derivation neighborhood for one of a plurality of transform coefficients using a sliding window that is determined based on a transform coefficient scan order and that includes a set of transform coefficients scanned prior to the one of the plurality of transform coefficients in the transform coefficient scan order, wherein the context derivation neighborhood indicates one or more transform coefficients of the plurality of transform coefficients from which a context is derived;
means for determining the context for the one of the plurality of transform coefficients based on the context derivation neighborhood; and
means for coding the one of the plurality of transform coefficients based on the determined context.

24. The apparatus of claim 23, further comprising means for moving the sliding window one position in the transform coefficient scan order after coding the one of the plurality of transform coefficients such that the sliding window includes the one of the plurality of transform coefficients.

25. The apparatus of claim 23, wherein the set of transform coefficients comprises a set of consecutive transform coefficients in the coefficient scan order.

26. The apparatus of claim 23, wherein the one of the plurality of transform coefficients has a scan order position n, and the context derivation neighborhood comprises transform coefficients at scan order positions n+i to n+j, wherein scan order position n is scanned after scan order positions n+i to n+j, and scan order position n+j is scanned after scan order position n+i.

27. The apparatus of claim 23, further comprising:
means for defining context derivation neighborhoods for other transform coefficients of the plurality of transform coefficients based on the transform coefficient scan order,
wherein each of the context derivation neighborhoods corresponds to a sliding window along the scan order relative to the respective coefficient to be coded.

28. The apparatus of claim 23, wherein the means for defining the context derivation neighborhood for the one of the plurality of transform coefficients comprises means for including a gap of at least one transform coefficient in the transform coefficient scan order between the one of the plurality of transform coefficients and transform coefficients associated with the context derivation neighborhood.

29. The apparatus of claim 28, wherein the transform coefficient has a scan order position n, and the context derivation neighborhood comprises transform coefficients at scan order positions n+2 to n+6, wherein scan order position n is scanned after scan order positions n+2 to n+6.

30. The apparatus of claim 23,
wherein the plurality of transform coefficients are associated with a sub-block of transform coefficients;
further comprising means for defining an initial context derivation neighborhood that is not based on the scan order for an initial transform coefficient of the plurality of transform coefficients, wherein the initial transform coefficient is scanned first in the sub-block in the transform coefficient scan order; and
means for coding the initial transform coefficient based on the initial context derivation neighborhood.

31. The apparatus of claim 23, wherein the means for coding the one of the plurality of transform coefficients comprises means for decoding the one of the plurality of transform coefficients.

32. The apparatus of claim 23, wherein the means for coding the one of the plurality of transform coefficients comprises means for encoding the one of the plurality of transform coefficients.

33. A non-transitory computer-readable medium comprising instructions that, when executed, cause one or more processors to:
define a context derivation neighborhood for one of a plurality of transform coefficients using a sliding window that is determined based on a transform coefficient scan order and that includes a set of transform coefficients scanned prior to the one of the plurality of transform coefficients in the transform coefficient scan order, wherein the context derivation neighborhood indicates one or more transform coefficients of the plurality of transform coefficients from which a context is derived;
determine the context for the one of the plurality of transform coefficients based on the context derivation neighborhood; and
code the one of the plurality of transform coefficients based on the determined context.

34. The computer-readable medium of claim 33, further comprising instructions that cause the one or more processors to move the sliding window one position in the transform coefficient scan order after coding the one of the plurality of transform coefficients such that the sliding window includes the one of the plurality of transform coefficients.

35. The computer-readable medium of claim 33, wherein the set of transform coefficients comprises a set of consecutive transform coefficients in the coefficient scan order.

36. The computer-readable medium of claim 33, wherein the one of the plurality of transform coefficients has a scan order position n, and the context derivation neighborhood comprises transform coefficients at scan order positions n+i to n+j, wherein scan order position n is scanned after scan order positions n+i to n+j, and scan order position n+j is scanned after scan order position n+i.

37. The computer-readable medium of claim 33, further comprising instructions that cause the one or more processors to:
define context derivation neighborhoods for other transform coefficients of the plurality of transform coefficients based on the transform coefficient scan order,
wherein each of the context derivation neighborhoods corresponds to a sliding window along the scan order relative to the respective coefficient to be coded.

38. The computer-readable medium of claim 33, wherein to define the context derivation neighborhood for the one of the plurality of transform coefficients, the instructions cause the one or more processors to include a gap of at least one transform coefficient in the transform coefficient scan order between the one of the plurality of transform coefficients and transform coefficients associated with the context derivation neighborhood.

39. The computer-readable medium of claim 38, wherein the transform coefficient has a scan order position n, and the context derivation neighborhood comprises transform coefficients at scan order positions n+2 to n+6, wherein scan order position n is scanned after scan order positions n+2 to n+6.

40. The computer-readable medium of claim 33,
wherein the plurality of transform coefficients are associated with a sub-block of transform coefficients;
further comprising instructions that cause the one or more processors to define an initial context derivation neighborhood that is not based on the scan order for an initial transform coefficient of the plurality of transform coefficients, wherein the initial transform coefficient is scanned first in the sub-block in the transform coefficient scan order; and
code the initial transform coefficient based on the initial context derivation neighborhood.

41. The computer-readable medium of claim 33, wherein to code the one of the plurality of transform coefficients, the instructions cause the one or more processors to decode the one of the plurality of transform coefficients.

42. The computer-readable medium of claim 33, wherein to code the one of the plurality of transform coefficients, the instructions cause the one or more processors to encode the one of the plurality of transform coefficients.

* * * * *